US010130183B2

(12) United States Patent
Fujita et al.

(10) Patent No.: US 10,130,183 B2
(45) Date of Patent: Nov. 20, 2018

(54) SEAT CUSHIONING MEMBER SUPPORT MECHANISM AND SEAT STRUCTURE

(71) Applicant: Delta Tooling Co., Ltd., Hiroshima-shi (JP)

(72) Inventors: Etsunori Fujita, Higashihiroshima (JP); Ryuji Kuwano, Hiroshima (JP)

(73) Assignee: Delta Tooling Co., Ltd., Hiroshima-shi (JP)

( * ) Notice: Subject to any disclaimer, the term of this patent is extended or adjusted under 35 U.S.C. 154(b) by 46 days.

(21) Appl. No.: 15/312,343

(22) PCT Filed: May 12, 2015

(86) PCT No.: PCT/JP2015/063546
§ 371 (c)(1),
(2) Date: Nov. 18, 2016

(87) PCT Pub. No.: WO2015/178238
PCT Pub. Date: Nov. 26, 2015

(65) Prior Publication Data
US 2017/0086590 A1  Mar. 30, 2017

(30) Foreign Application Priority Data

May 20, 2014  (JP) ................................ 2014-104784

(51) Int. Cl.
*A47C 7/32* (2006.01)
*B60N 2/90* (2018.01)
(Continued)

(52) U.S. Cl.
CPC ................. *A47C 7/32* (2013.01); *A47C 7/02* (2013.01); *B60N 2/06* (2013.01); *B60N 2/7047* (2013.01); *B60N 2/90* (2018.02)

(58) Field of Classification Search
CPC ........... A47C 7/32; B60N 2/06; B60N 2/7047
See application file for complete search history.

(56) References Cited

U.S. PATENT DOCUMENTS 6,585,240 B1 * 7/2003 Fujita .................... B60N 2/502
                                                        267/136
7,172,251 B2 * 2/2007 Takata ................. B60N 2/1615
                                                        248/421
(Continued)

FOREIGN PATENT DOCUMENTS

JP       5-285025 A    11/1993
JP       7-155236 A    6/1995
(Continued)

OTHER PUBLICATIONS

International Search Report dated Jun. 16, 2015 in PCT/JP2015/063546 filed May 12, 2015.

*Primary Examiner* — Philip F Gabler
(74) *Attorney, Agent, or Firm* — Oblon, McClelland, Maier & Neustadt, L.L.P.

(57) ABSTRACT

A sheet cushioning member includes front links coupled to a front torsion bar and rear links coupled to a rear torsion bar are arranged at a predetermined interval from each other in a front and rear direction of a seat, and when a predetermined load or larger is applied, the front links and the rear links rotate in opposite directions, and dampers are disposed to extend between lower portions of the front links and the rear links. When a predetermined load fluctuation or larger occurs, the dampers expand or contract to exhibit a damping force, and a load fluctuation smaller than this does not cause the dampers to expand or contract and is alleviated by elasticity of the front torsion bar and the rear torsion bar. An impact absorbing characteristic is thereby improved with a simple structure.

10 Claims, 19 Drawing Sheets

(51) Int. Cl.
    *A47C 7/02*     (2006.01)
    *B60N 2/06*     (2006.01)
    *B60N 2/70*     (2006.01)

(56) References Cited

U.S. PATENT DOCUMENTS

| | | | | |
|---|---|---|---|---|
| 7,416,256 B2 * | 8/2008 | Fujita | ............... | B60N 2/502 |
| | | | | 297/216.1 |
| 8,104,832 B2 * | 1/2012 | Fujita | ............... | B60N 2/0705 |
| | | | | 297/217.2 |
| 8,567,770 B2 * | 10/2013 | Fujita | ............... | B60N 2/50 |
| | | | | 248/566 |
| 8,698,643 B2 * | 4/2014 | Schmitt | ............... | B60N 2/54 |
| | | | | 180/273 |
| 8,714,642 B2 * | 5/2014 | Lamparter | ............... | B60N 2/24 |
| | | | | 297/216.1 |
| 9,682,642 B2 * | 6/2017 | Fujita | ............... | B60N 2/54 |
| 2006/0279120 A1 * | 12/2006 | Fujita | ............... | B60N 2/502 |
| | | | | 297/284.2 |
| 2014/0354030 A1 * | 12/2014 | Kolb | ............... | B60N 2/52 |
| | | | | 297/452.49 |
| 2016/0082870 A1 * | 3/2016 | Fujita | ............... | B60N 2/501 |
| | | | | 248/561 |
| 2017/0086590 A1 * | 3/2017 | Fujita | ............... | A47C 7/32 |

FOREIGN PATENT DOCUMENTS

| | | | |
|---|---|---|---|
| JP | 8-299098 A | 11/1996 | |
| JP | 2002-78561 A | 3/2002 | |
| JP | 2006-345952 A | 12/2006 | |

* cited by examiner

SEAT CUSHIONING MEMBER SUPPORT MECHANISM AND SEAT STRUCTURE

TECHNICAL FIELD

The present invention relates to a seat cushioning member support mechanism used in a seat structure in which a cushioning member is disposed across a cushion frame, and a seat structure including the seat cushioning member support mechanism, and in particular, relates to a seat cushioning member support mechanism suitably used in transportation equipment such as automobiles, aircrafts, trains, and ships, and a seat structure including the seat cushioning member support mechanism.

BACKGROUND ART

Patent Document 1 discloses a seat structure in which a cushioning member such as a three-dimensional knitted fabric (three-dimensional net member) is disposed across a cushion frame of a seat cushion part. In the seat structure in which the cushioning member is thus disposed across the cushion frame, a base net (note that, in the present specification, the simple expression of a "cushioning member" of a seat cushion part means the cushioning member including the base net disposed as a lower layer thereof) such as a three-dimensional knitted fabric or a two-dimensional fabric is provided via an elastic member for the purpose of preventing bottom touch and increasing a vibration absorbing characteristic and so on. In Patent Document 1, torsion bar units each including a torsion bar, arms coupled to the torsion bar and rotatably supported on the torsion bar as a fulcrum, and a support frame supported by the arms are disposed in front of and behind a seat cushion, and the base net is stretched between the support frame of the front torsion bar unit and the support frame of the rear torsion bar unit to be elastically supported.

PRIOR ART DOCUMENT

Patent Document

Patent Document 1: Japanese Patent Application Laid-open No. 2006-345952

DISCLOSURE OF THE INVENTION

Problems to Be Solved by the Invention

In the art disclosed in Patent Document 1, the base net elastically supported by the two torsion bars makes it possible to exhibit a sufficient feeling of stroke when a user is seated, without giving the user a feeling of something foreign, even though the cushioning member thinner than an urethane member typically used conventionally as a cushioning member of, for example, automobile seats is used to set a hip point (H.P.) lower than that in a seat using the urethane member. Further, because the two torsion bars function against vibration which is input during driving, it is possible to exhibit a high vibration absorbing characteristic. In particular, in Patent Document 1, the torsion bars serving as the rotation fulcrums of the support frames rotated forward and rearward by the arms are designed to be set higher than the support frame in the rear torsion bar unit and lower than the support frame in the front torsion bar unit. Consequently, the front torsion bar unit mainly acts against a small load fluctuation caused by vibration input during normal driving, and both the front and rear torsion bar units fully function against a somewhat large load fluctuation. However, there is always a demand for improvement of a vibration absorbing characteristic, an impact absorbing characteristic, and the like.

The present invention was made in consideration of the above, and its object is to provide a seat cushioning member support mechanism having a simple structure yet capable of exhibiting a high vibration absorbing characteristic during normal driving and in addition capable of achieving a further improvement of an impact absorbing characteristic when a larger load fluctuation occurs due to an impact, and to provide a seat structure including the seat cushioning member support mechanism.

Means for Solving the Problems

To solve the aforesaid problems, the seat cushioning member support mechanism of the present invention is a seat cushioning member support mechanism which elastically supports a cushioning member of a seat cushion part, the seat cushioning member support mechanism including: a first spring-damping mechanism to which displacement serving as a trigger is input; and a second spring-damping mechanism which exhibits a spring-damping characteristic according to the displacement input to the first spring-damping mechanism, wherein the first spring-damping mechanism and the second spring-damping mechanism are arranged in a stack direction and connected to each other via a link, and the first spring-damping mechanism and the second spring-damping mechanism are provided in a series positional relation.

Preferably, the seat cushion part has a front torsion bar and a rear torsion bar arranged at a predetermined interval from each other in a front and rear direction of a seat and extending along a width direction of the seat, and also has, as the link: a front link whose middle portion is coupled to the front torsion bar and whose upper portion and lower portion are rotatable in the front and rear direction about the front torsion bar; and a rear link whose middle portion is coupled to the rear torsion bar and whose upper portion and lower portion are rotatable in the front and rear direction about the rear torsion bar, and the first spring-damping mechanism is constituted by the front torsion bar, the rear torsion bar, and the cushioning member disposed to extend between the upper portions of the front link and the rear link.

Preferably, the second spring-damping mechanism is constituted by a lower portion connecting mechanism including at least one of a damping member and an elastic member disposed to extend between the lower portions of the front link and the rear link.

Preferably, a plurality of the front links and a plurality of the rear links are coupled along the front torsion bar and the rear torsion bar respectively, a front support frame is supported on the upper portions of the plural front links along the width direction of the seat, a rear support frame is supported on the upper portions of the plural rear links along the width direction of the seat, and the cushioning member is disposed to extend between the front support frame and the rear support frame.

Preferably, a front coupling pipe is supported on the lower portions of the plural front links along the width direction of the seat, a rear coupling pipe is supported on the lower portions of the plural rear links along the width direction of the seat, and the lower portion connecting mechanism is disposed between the front coupling pipe and the rear coupling pipe.

Preferably, the lower portion connecting mechanism has a front portion supported on a rear portion of a front coupling link whose front portion is fixed to the front coupling pipe, and has a rear portion supported on a front portion of a rear coupling link whose rear portion is fixed to the rear coupling pipe.

Preferably, the front link and the rear link are formed in a substantially L-shape and are disposed to face each other back-to-back.

Preferably, a plurality of the lower damping mechanisms are disposed to extend between the lower portions of the front links and the rear links, and the plural lower damping mechanisms are constituted by a combination of only the damping members, a combination of only the elastic members, or a combination of the damping member and the elastic member.

The damping member constituting the lower portion connecting mechanism can be formed using at least one kind out of a magnetic damper, a friction damper, and an oil damper. Further, the elastic member constituting the lower damping mechanism can be formed using a coil spring.

Preferably, the cushioning member extending between the upper portions of the front link and the rear link is a base net located on a lower layer out of a plurality of vertically arranged cushioning members included in the seat back part.

The seat structure of the present invention is a seat structure including a seat cushion part having: a cushion frame including a pair of side frames arranged at a predetermined interval from each other in a width direction of a seat; and a cushioning member supported by the cushion frame, wherein the cushioning member is supported by the aforesaid seat cushioning member support mechanism, and the front torsion bar and the rear torsion bar included in the seat cushioning member support mechanism are disposed to extend between the pair of side frames in the cushion frame.

Effect of the Invention

In the present invention, the first spring-damping mechanism and the second spring-damping mechanism are arranged in the stack direction and connected via the link, and the first spring-damping mechanism and the second spring-damping mechanism are provided in the series positional relation. Consequently, when vibration or impact displacement serving as the trigger is input to the first spring-damping mechanism, the second spring-damping mechanism acts in accordance with the input. At this time, due to the serial positional relation of the first spring-damping mechanism and the second spring-damping mechanism in the present invention, the total spring constant k of a spring system composed of the both decreases, and a damping system increases, resulting in a system having a nonlinear characteristic of a Duffing type. Therefore, a vibration absorbing characteristic and an impact absorbing characteristic are both improved.

DESCRIPTION OF EMBODIMENTS

Figure 1:
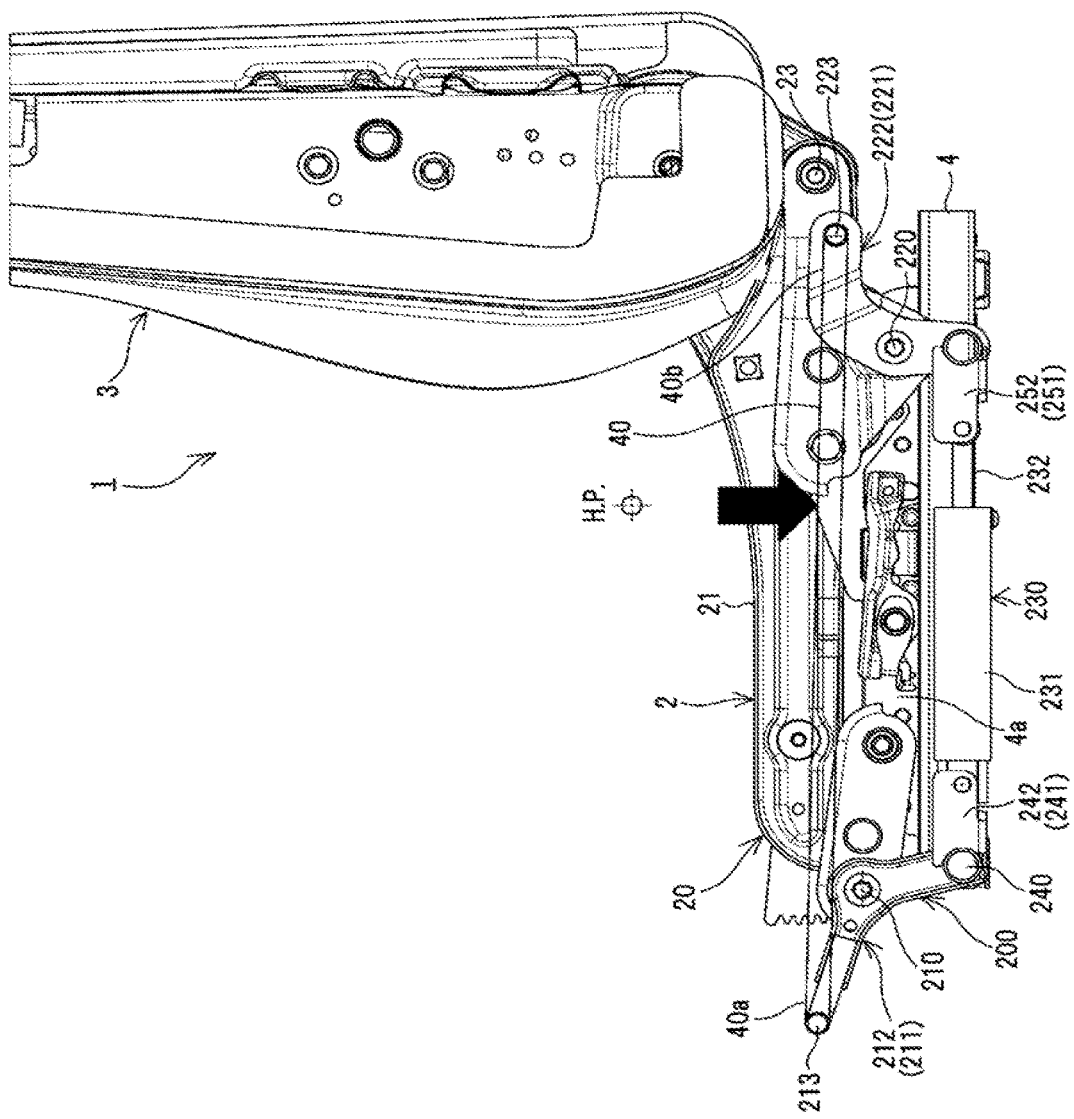
FIG. 1 is a cross-sectional view illustrating an essential part of a seat structure according to one embodiment of the present invention.
Figure 2:
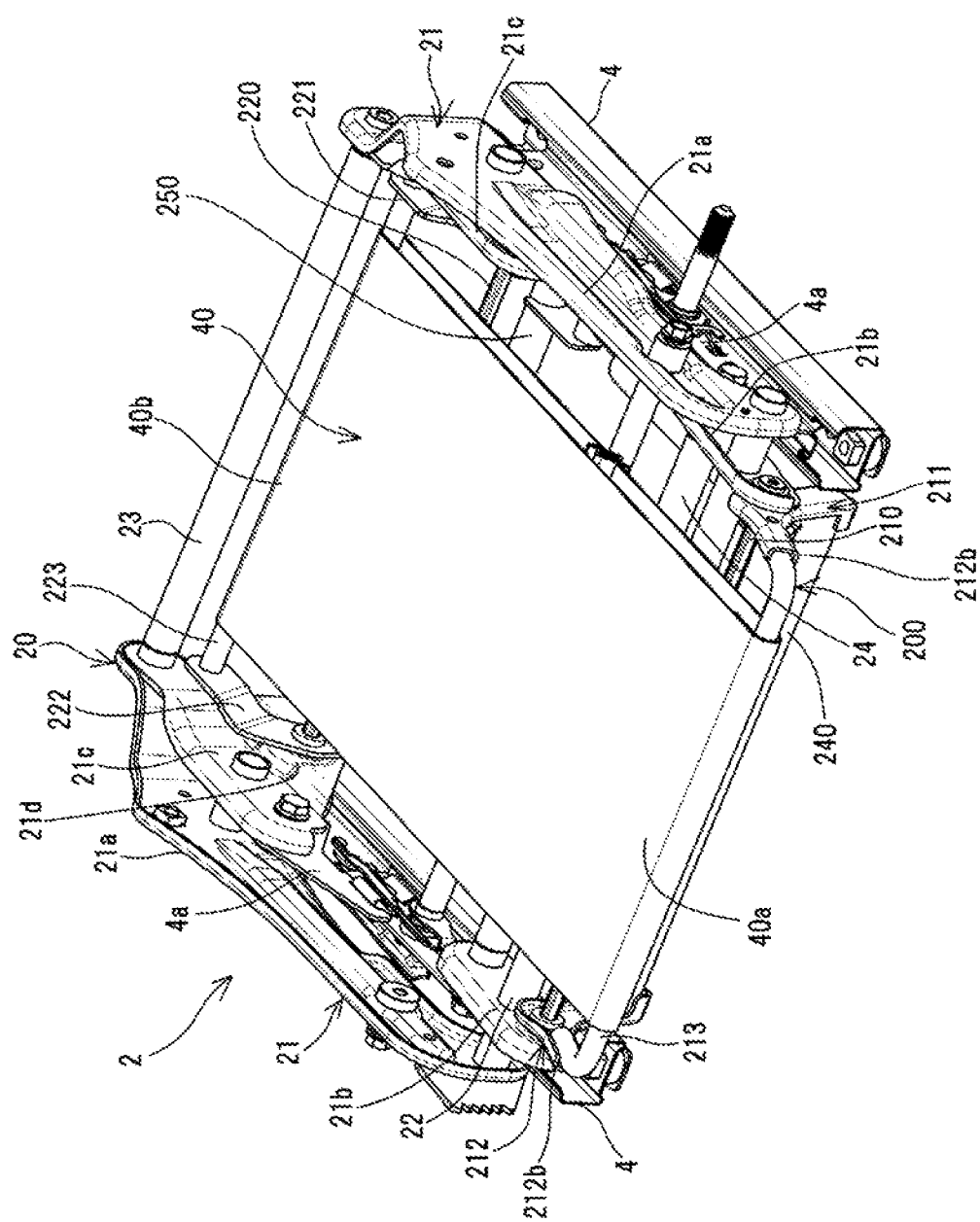
FIG. 2 is a perspective view illustrating a seat cushion part and a seat cushioning member support mechanism of the seat structure according to the embodiment.
Figure 3:
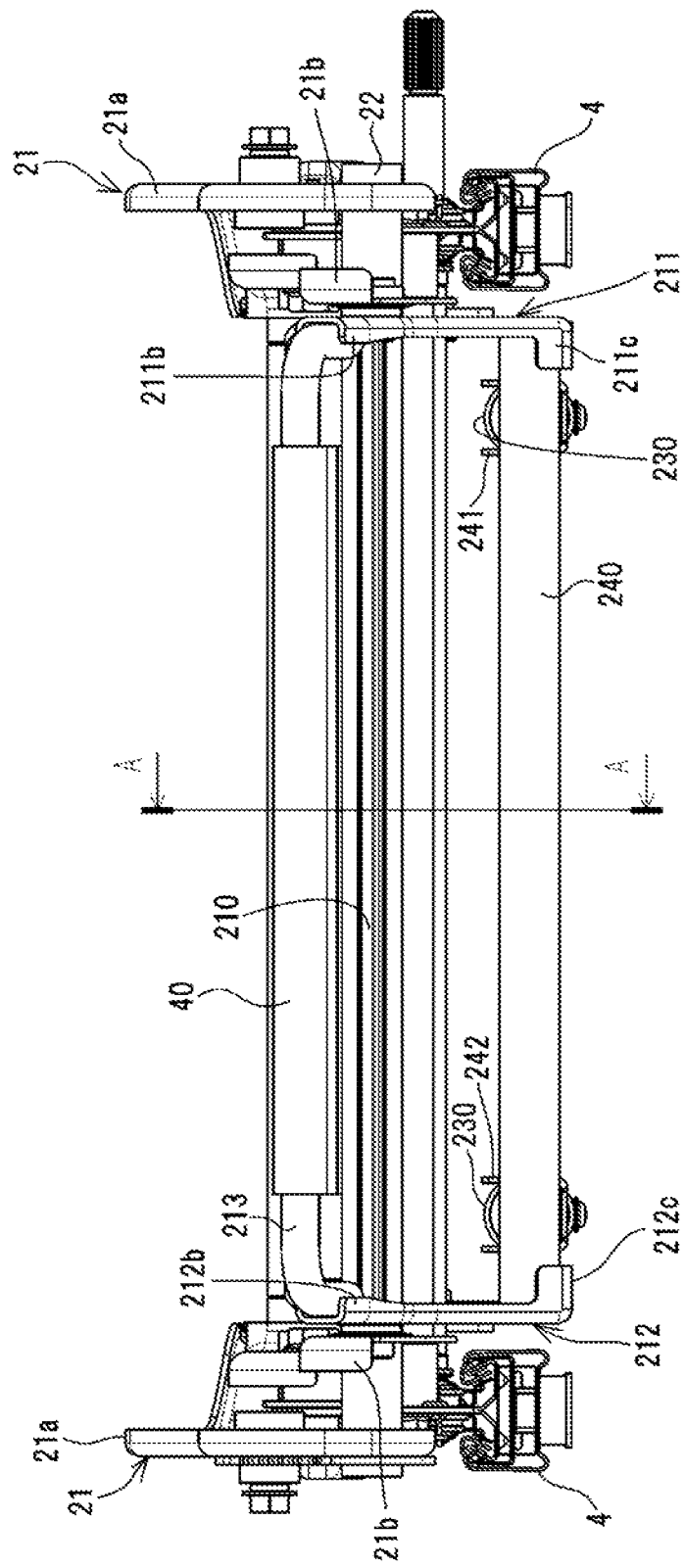
FIG. 3 is a front view of FIG. 2.

The present invention will be hereinafter described in more detail based on embodiments illustrated in the drawings. FIG. 1 is a side view illustrating an essential part of a seat structure 1 including a seat cushioning member support mechanism 200 according to one embodiment of the present invention, and FIG. 2 to FIG. 8 are views illustrating details of the seat cushioning member support mechanism 200.

The seat structure 1 of this embodiment includes a seat cushion part 2 and a seat back part 3 and is used for an automobile, especially for a driver seat or for a front passenger seat. The seat cushion part 2 is attached to a floor (installation surface) of a vehicle body via slide adjusters 4, 4 arranged at a predetermined interval from each other in a width direction of the seat.

The seat cushion part 2 has a cushion frame 20 including a pair of side frames 21, 21 coupled to upper rails 4a, 4a of the slide adjusters 4, 4. The side frames 21, 21 include outer plates 21a, 21a located on outer sides of the upper rails 4a, 4a, front inner plates 21b, 21b located on inner sides of the upper rails 4a, 4a and disposed near a front part, and rear inner plates 21c, 21c located on the inner sides of the upper rails 4a, 4a and disposed near a rear part.

A front frame 22 and a rear frame 23 each formed of a pipe are disposed to extend between front ends and between rear ends of the pair of side frames 21, 21 respectively. End portions of the front frame 22 penetrate through the front inner plates 21b, 21b and the outer plates 21a, 21a, and end portions of the rear frame 23 penetrate through the rear inner plates 21c, 21c and the outer plates 21a, 21a. Further, at a position slightly rearward from the front frame 22, a reinforcing pipe 24 extends. The reinforcing pipe 24 have end portions penetrating through the front inner plates 21b, 21b and further penetrating through the upper rails 4a, 4a. In this manner, the side frames 21, 21 are disposed, with their plates on the outer sides (reference sign 21a, 21a) and their plates on the inner sides (reference sign 21b, 21b and 21c, 21c) sandwiching the upper rails 4a, 4a, and further the front frame 22, the rear frame 23, and the reinforcing pipe 24 are disposed so as to penetrate through these plates, whereby high rigidity is imparted to the cushion frame 20.

The seat cushioning member support mechanism 200 is assembled in the seat cushion part 2 including the above-described cushion frame 20. The seat cushioning member support mechanism 200 includes a front torsion bar 210 and a rear torsion bar 220 which are arranged at a predetermined interval from each other in a front and rear direction of the seat structure 1 at positions sandwiching a hip pint (H.P.).

Figure 7:
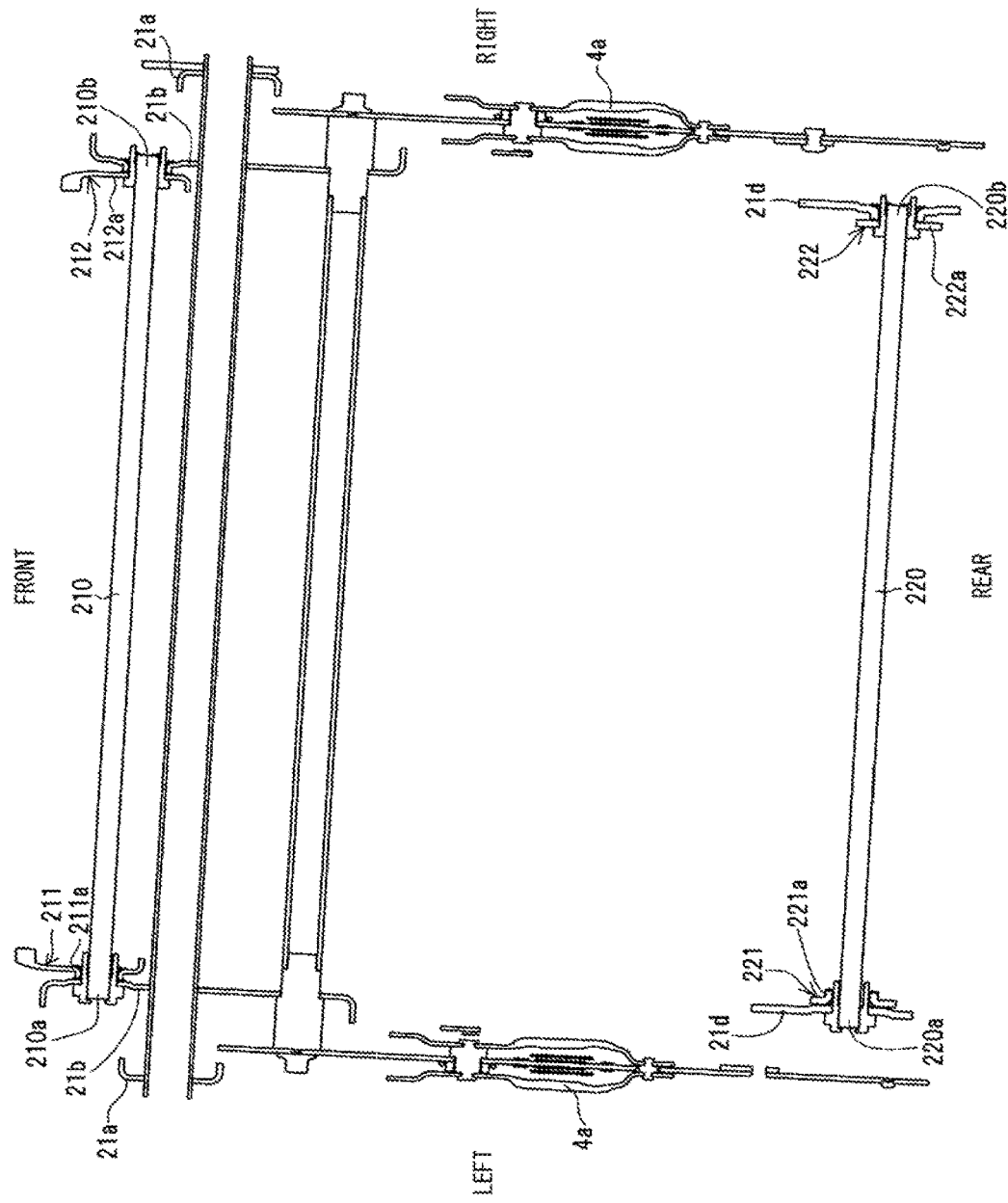
FIG. 7 is a view seen in the arrow B-B direction of FIG. 5, and is an explanatory view of a coupling relation of a front torsion bar, a rear torsion bar, front links, and rear links.
Figure 8:
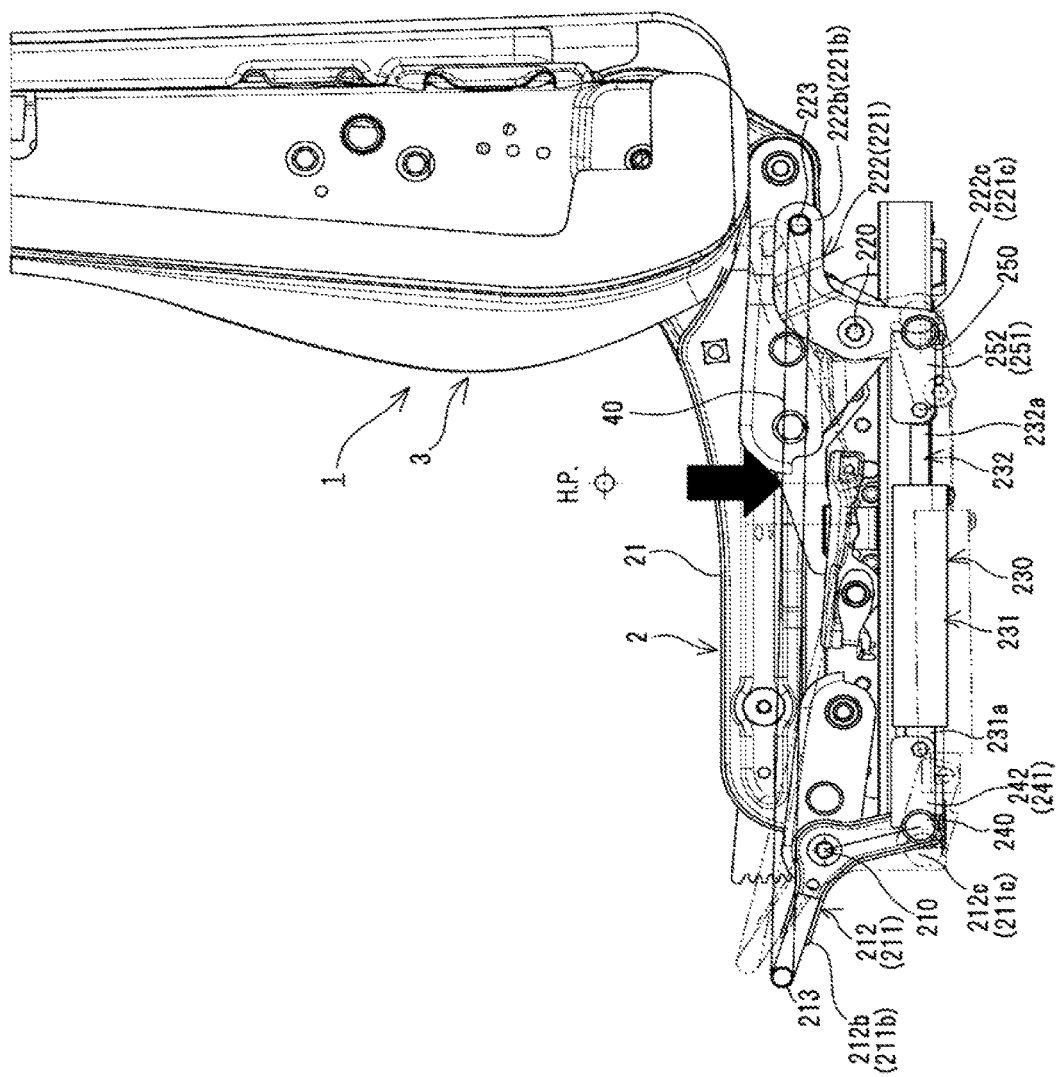
FIG. 8 is an explanatory view of the operation of the seat structure and the seat cushioning member support mechanism according to the embodiment, and is a view illustrating a state before an impact force is input and a state after the impact force is input.

The front torsion bar 210 is disposed to extend between positions close to front ends of the front inner plates 21b, 21b supported by the front frame 22 and the reinforcing pipe 24. In this embodiment, as illustrated in FIG. 7, an end portion 210a on one side (for example, on a left side of the seat) of the front torsion bar 210 is fixed to the front inner plate 21b disposed on the left side, to serve as a fixed end about which the front torsion bar 210 torsionally deforms.

The rear torsion bar 220 is disposed to extend between the rear inner plates 21c, 21c. Specifically, on the rear inner plates 21c, 21c, projecting pieces 21d, 21d projecting downward are integrally provided closer to the rear frame 23 than to the hip point (H.P.), and the rear torsion bar 220 extends between the projecting pieces 21d, 21d. As illustrated in FIG. 7, in the rear torsion bar 220 as well, its end portion 220a on the left side of the seat in this embodiment is fixed to the projecting piece 21d of the rear inner plate 21c located on the left side.

At positions that are near the end portions 210a, 210b of the front torsion bar 210 and on inner sides of the front inner plates 21b, 21b, front links 211, 212 are supported. As is apparent from FIG. 1 and FIG. 4, the front links 211, 212 are formed in a substantially L-shape in a side view, and their middle portions 211a, 212a are supported by the front torsion bar 210. At this time, the front links 211, 212 are attached, with their upper portions 211b, 212b being located slightly higher and more forward than the middle portions 211a, 212a, and with their lower portions 211c, 212c being located lower than the middle portions 211a, 212a. Further, in this embodiment, as illustrated in FIG. 7, the front link 212 disposed on the right side is coupled to the right end portion 210b of the front torsion bar 210, and the front link 211 disposed on the left side is disposed so as to be rotatable about the left end portion 210a which is the fixed end of the front torsion bar 210.

A front support frame 213 in a substantially C-shape is disposed to extend between the upper portions 211b, 212b of the left and right front links 211, 212. End portions of the front support frame 213 are fixed to the upper portions 211b, 212b of the front links 211, 212 by welding or the like. Accordingly, when a force moving the front support frame 213 up and down acts, the front support frame 213 rotates together with the left and right front links 211, 212 about their connection positions with the front torsion bar 210. At this time, the upper portion 212b of the right front link 212 rotates, so that the right end portion 210b of the front torsion bar 210 is twisted in the same direction about the left end portion 210a which is the fixed end, and elasticity of the front torsion bar 210 functions.

At positions that are close to end portions 220a, 220b of the rear torsion bar 220 and on the inner sides of the rear inner plates 21c, 21c and the projecting pieces 21d, 21d, the rear links 221, 222 are supported. As is apparent from FIG. 1 and FIG. 4, the rear links 221, 222 are also formed in a substantially L-shape in a side view, and their middle portions 221a, 222a are supported by the rear torsion bar 220. At this time, the rear links 221, 222 are attached, with their upper portions 221b, 222b being located slightly higher and more rearward than their middle portions 221a, 222a, and with their lower portions 221c, 222c being located lower than the middle portions 221a, 222a. Accordingly, the front links 211, 212 and the rear links 221, 222, which are both formed in the substantially L-shape, are attached so as to face each other back-to-back, with their upper portions 211b, 212b and 221b, 222b projecting in opposite directions. Further, in this embodiment, as illustrated in FIG. 7, the rear link 222 disposed on the right side is coupled to the right end portion 220b of the rear torsion bar 220, and the rear link 221 disposed on the left side is provided so as to be rotatable about the left end portion 220a which is the fixed end of the rear torsion bar 220.

A rear support frame 223 is disposed to extend between the upper portions 221b, 222b of the left and right rear links 221, 222. Then, when a force moving the rear support frame 223 up and down acts, the rear support frame 223 rotates together with the left and right rear links 221, 222 about their connection positions with the rear torsion bar 220. At this time, the upper portion 222b of the right rear link 222 rotates, so that the right end portion 220b of the rear torsion bar 220 is twisted in the same direction about the left end portion 220a which is the fixed end, and elasticity of the rear torsion bar 220 functions.

Figure 4:
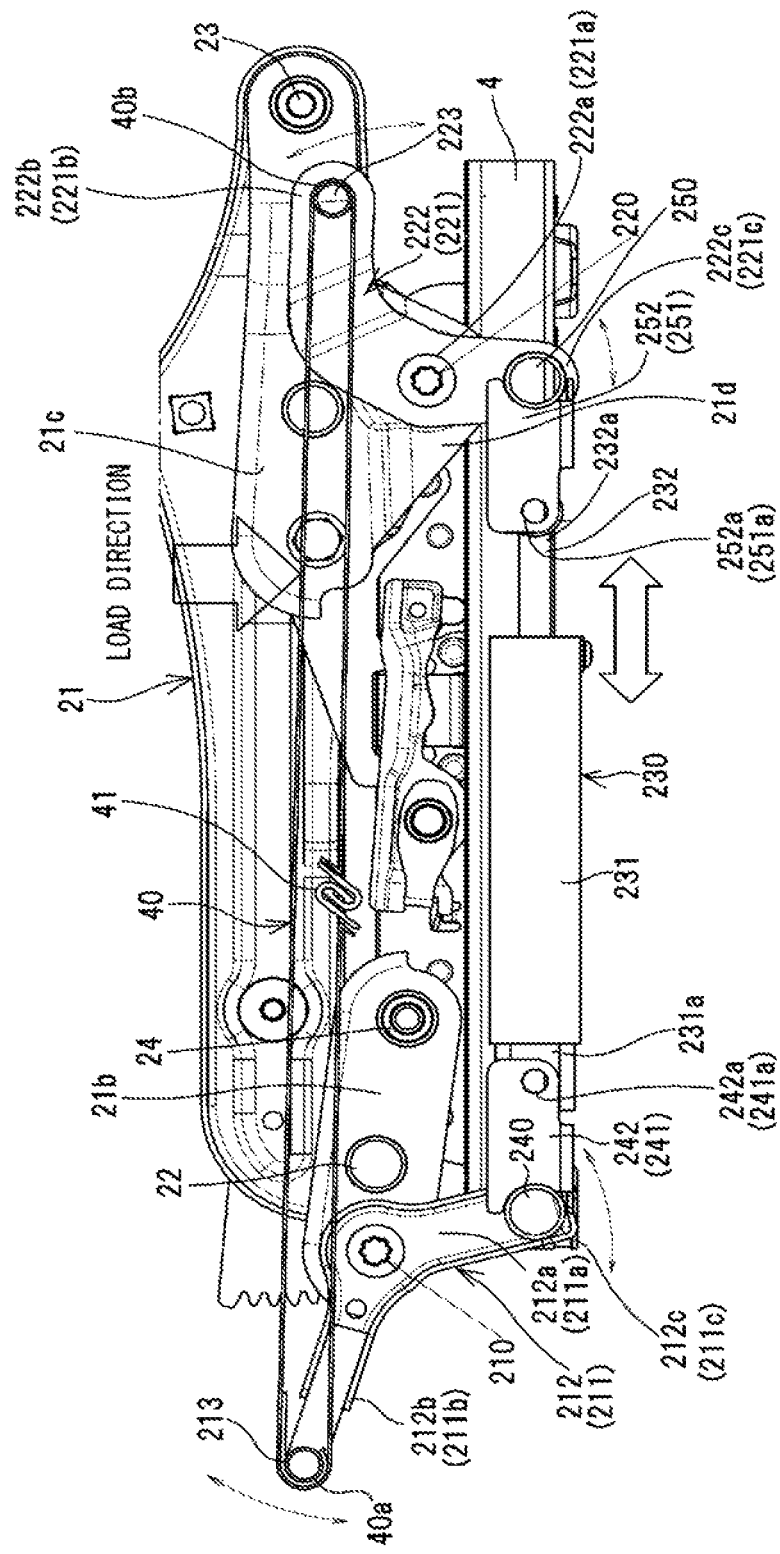
FIG. 4 is a view seen in the arrow A-A direction of FIG. 3.
Figure 5:
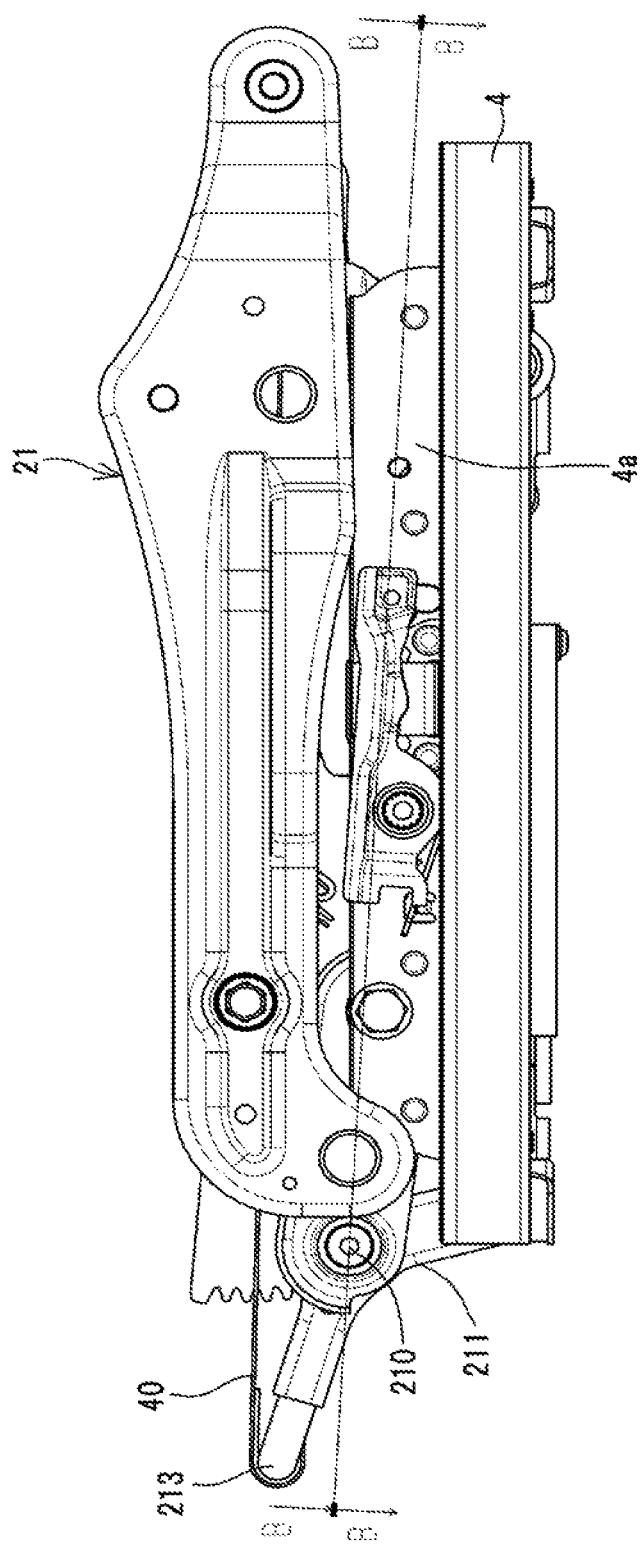
FIG. 5 is a side view of FIG. 2.
Figure 6:
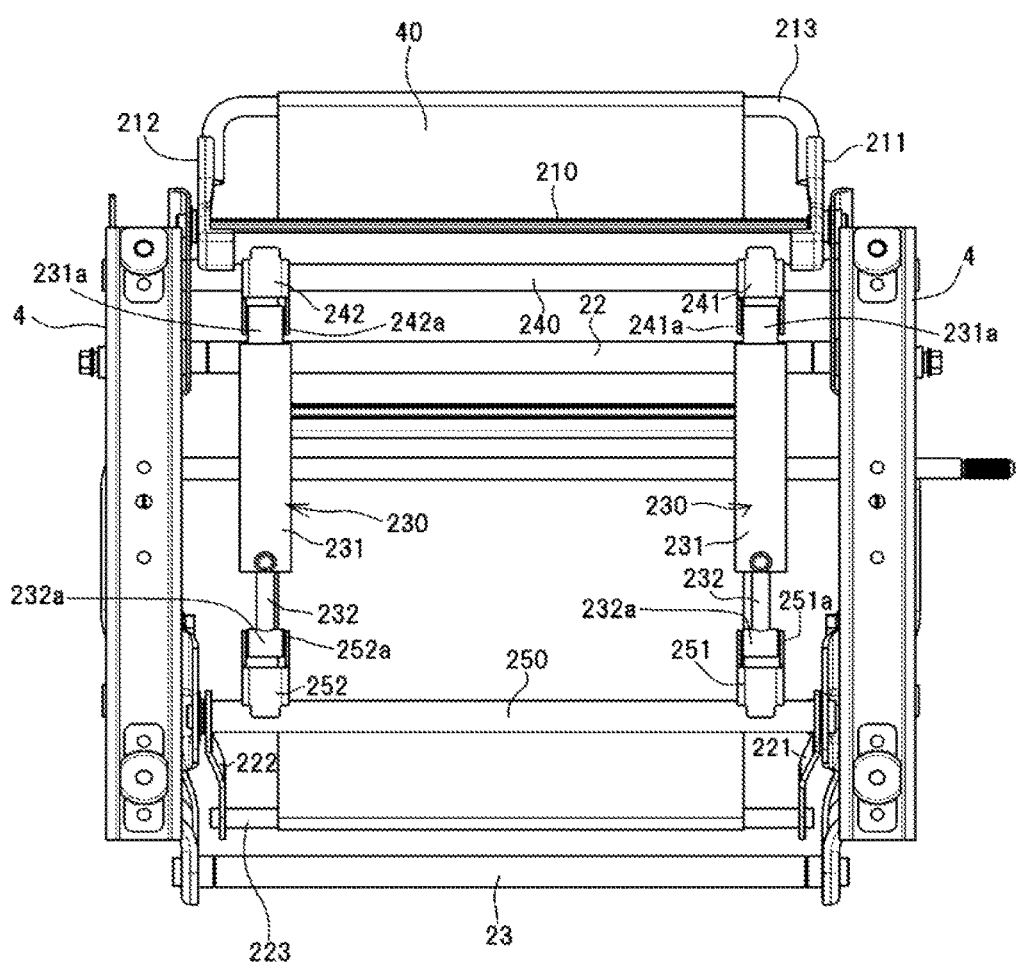
FIG. 6 is a bottom view of FIG. 2.

Lower portion connecting mechanisms are disposed to extend between the lower portions 211c, 212c of the front links 211, 212 and the lower portions 221c, 222c of the rear links 221, 222. In this embodiment, as the lower portion connecting mechanisms, dampers 230, 230 which are damping members are used, and they are disposed on the left and right of the seat. As the dampers 230, 230, direct-acting dampers in which movable parts such as pistons move relatively to cylindrical members 231, 231 are preferably used. In this embodiment, as illustrated in FIG. 1, FIG. 4, and so on, the cylindrical members 231, 231 are disposed on a front side of the seat and rod members 232, 232 coupled to the movable parts are disposed on a rear side of the seat, but their positions may be reversed. The dampers 230, 230 are disposed substantially in parallel to the installation surface (here, the vehicle floor), with front portions of the dampers 230, 230 (in this embodiment, end portions 231a, 231a of the cylindrical members 231, 231) being coupled to the lower portions 211c, 212c of the front links 211, 212, and with rear portions of the dampers 230, 230 (in this embodiment, end portions 232a, 232a of the rod members 232, 232) being coupled to the lower portions 221c, 222c of the rear links 221, 222.

Further, in this embodiment, a front coupling pipe 240 is disposed to extend between the lower portions 211c, 212c of the front links 211, 212, and front portions of front coupling links 241, 242 projecting rearward are fixed to the front coupling pipe 240 by welding or the like at a predetermined interval from each other in the width direction. Further, a rear coupling pipe 250 is disposed to extend between the lower ends 221c, 222c of the rear links 221, 222, and rear portions of rear coupling links 251, 252 projecting forward are fixed to the rear coupling pipe 250 by welding or the like at a predetermined interval from each other in the width direction. Then, the end portions 231a, 231a of the cylindrical members 231, 231 which portions are the front portions of the dampers 230, 230 are supported on rear portions 241a, 242a of the front coupling links 241, 242 so as to be relatively rotatable, and the end portions 232a, 232a of the rod members 232, 232 which portions are the rear portions of the dampers 230, 230 are supported on front portions 251a, 252a of the rear coupling links 251, 252 so as to be relatively rotatable.

Note that the dampers 230, 230 may be any dampers capable of exhibiting a predetermined damping force, and for example, magnetic dampers, oil dampers, friction dampers, or the like are usable. However, since they differ in characteristics such as speed dependence, appropriate ones may be selected according to the intended use or the like of the seat structure in which the dampers 230, 230 are used (for example, for a driver seat, for a front passenger seat, for a luxury car, or for a sports car). Further, two kinds or more can also be used together. Further, bidirectional dampers exhibiting a predetermined damping force whether the rod members 232 move in a contraction direction or in an expansion direction relatively to the cylindrical members 231 are usable, or dampers of a type which can be set to exhibit a larger damping force at the time of the displacement in a load application direction than in a weight releasing direction are also usable.

On the cushion frame 20, the cushioning member of the seat cushion part 2 is disposed. The structure of the cushioning member is not limited, but in this embodiment, cushioning members stretched on the cushion frame 20 and stacked in plurality in an up and down direction are provided. For example, a cushioning member formed of a two-dimensional fabric (knitted fabric, woven fabric, net fabric, or the like), formed of a two-dimensional fabric and a thin urethane member stacked thereon, formed of a three-dimensional fabric (a three-dimensional knitted fabric, a three-dimensional woven fabric, or the like), or formed of any of the above in which elastic yarns are appropriately included is disposed as an upper layer cushioning member between the pair of side frames 21, 21, and on a lower layer thereof, a base net 40 also constituting the cushioning member is disposed. A front portion 40a and a rear portion 40b of the base net 40 are coupled to the front support frame 213 and the rear support frame 223 respectively.

The base net 40 may be disposed as a single piece type, with its front portion 40a and its rear portion 40b wrapped on the front support frame 213 and the rear support frame 223 respectively, but in this embodiment, the base net 40 is passed around the front support frame 213 and the rear support frame 223 from an upper side to a lower side, and thereafter its edges are coupled at a middle portion between the front support frame 213 and the rear support frame 223 using a coupling member 41 (refer to FIG. 4). Consequently, the base net 40 is disposed in two upper and lower layers, which can enhance the bottom touch prevention function and so on. Incidentally, as a material forming the base net 40, the same material as that of the upper layer cushioning member is usable, but a three-dimensional knitted fabric or a two-dimensional fabric including elastic yarns is preferably used because they have a high damping function.

Here, since this embodiment has the above-described structure, the base net 40 which is the cushioning member, the front torsion bar 210, and the rear torsion bar 220 constitute a first spring-damping mechanism, and the dampers 230, 230 disposed at a position in the stack direction of the above members constitute a second spring-damping mechanism, when external vibration or impact is applied. That is, when the external vibration or impact is input, the base net 40, the front torsion bar 210, and the rear torsion bar 220 constituting the first spring-damping mechanism are displaced. With this displacement serving as a trigger, the damping force of the dampers 230, 230 constituting the second spring-damping mechanism which is in a series positional relation with the first spring-damping mechanism acts via the front links 211, 212 and the rear links 221, 222. In this embodiment, the use of the dampers 230, 230 as the second spring-damping mechanism makes damping coefficients of damping systems in the first spring-damping mechanism and the second spring-damping mechanism large to increase a damping ratio. This as a result can contribute to an improvement of especially an impact absorbing characteristic.

Further, since this embodiment has the above-described structure, it is possible to adjust passive mechanical characteristics to various characteristics against a load fluctuation input to the base net 40, without relying on the control by an electrical element such as a limit switch, by adjusting at least one of the following factors to a desired value: an initial tensile force when the base net 40 which is the cushioning member is stretched between the front support frame 213 and the rear support frame 223 (for example, setting the initial tensile force low can increase the damping force), characteristics of the dampers 230, 230, which are damping members, to be selected as the lower portion connecting mechanisms (the kind such as the magnetic damper or the friction damper, the magnitude of the functioning damping force, and, so on, or in a case where an elastic member such as a coil spring is used as in later-described embodiments, its spring characteristic, or a predetermined characteristic that functions depending on, for example, how the elastic member and the damping member are combined), the distance in the front links 211, 212 from connection positions with the front torsion bar 210 to the front support frame 213 which is a connection position with the base net 40, the distance in the rear links 221, 222 from connection positions with the rear torsion bar 220 to the rear support frame 223 which is a connection position with the base net 40, the distance in the front links 211, 212 from connection positions with the front torsion bar 210 to the front coupling pipe 240 which is connection positions with the dampers 230, 230, and the distance in the rear links 221, 222 from connection positions with the rear torsion bar 220 to the rear coupling pipe 250 which is connection positions with the dampers 230, 230. As a result, with a simple structure, it is possible to provide mechanisms having various characteristics such as, for example, a structure emphasizing an improvement of characteristics against low-frequency impact vibration, and a structure emphasizing an improvement of characteristics against high-frequency vibration.

Figure 9:
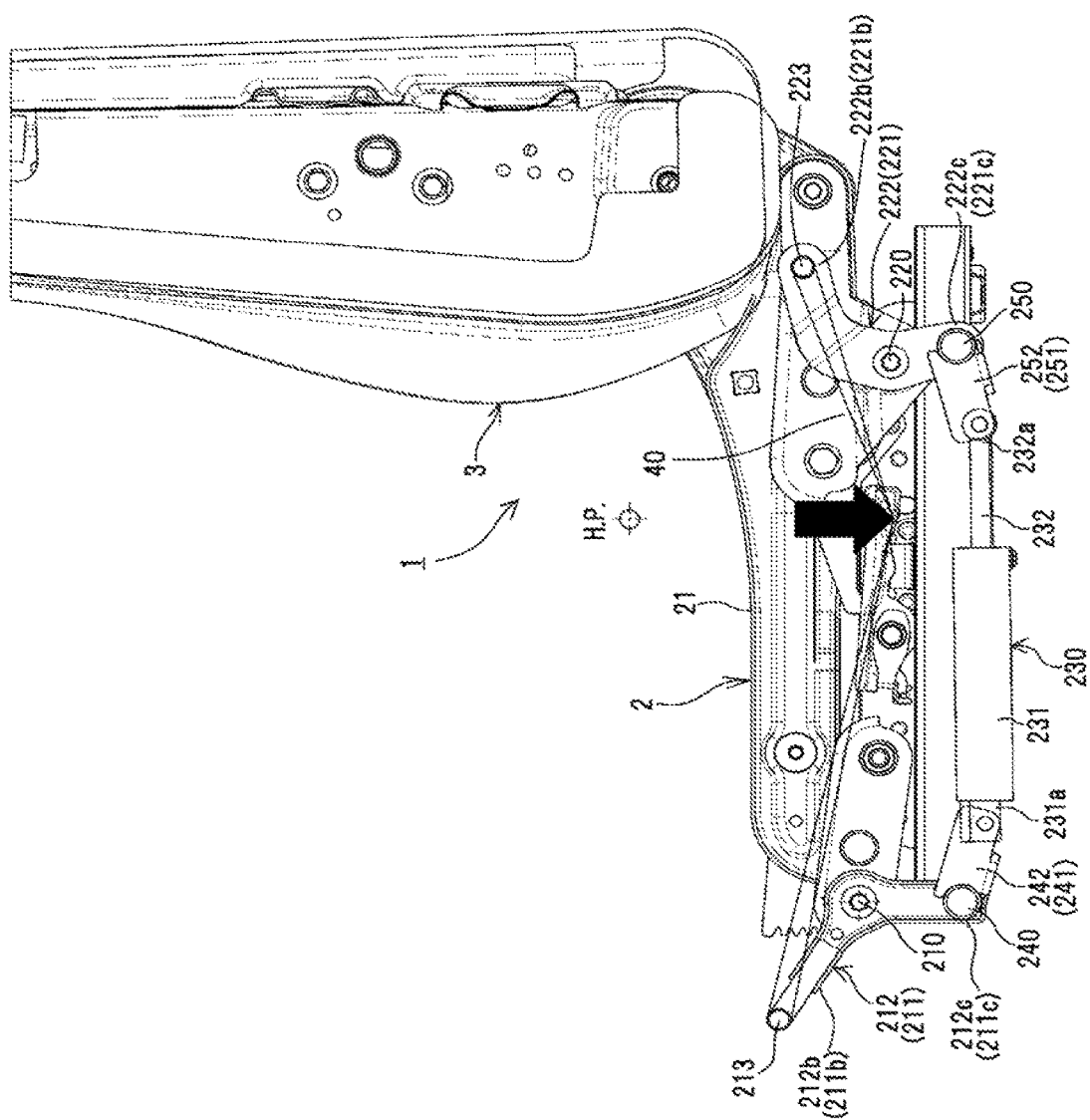
FIG. 9 is a view illustrating only the state after the impact force is input in FIG. 8.

Next, specific operations of this embodiment will be described using FIG. 8 to FIG. 11. If a large load fluctuation equal to or larger than a predetermined load fluctuation (a load fluctuation equal to or higher than a load fluctuation causing the expansion or contraction operation of the dampers 230 by which the damping force is exhibited) occurs due to the input of an impact force when, for example, the vehicle rides over bumps during driving in a state where a person is seated in the seat structure 1, a large load is applied downward around the hip point (H.P.) Then, the base net 40 is greatly displaced downward around the vicinity of the hip point from the position of the solid line in FIG. 8 to displace the front support frame 213 and the rear support frame 223 inward as illustrated by the two-dot chain lines in FIG. 8 and as illustrated in FIG. 9. In synchronization with the inward displacement of the front support frame 213 and the rear support frame 223, the upper ends 211b, 212b of the front links 211, 212 rotate inward (in the clockwise direction in FIG. 8) and the upper ends 221b, 222b of the rear links 221, 222 also rotate inward (in the counterclockwise direction in FIG. 8), both by a predetermined angle. In this embodiment, since the right front link 212 and rear link 222 are coupled to the right end portions 210b, 220b of the front torsion bar 210 and the rear torsion bar 220, the right end portions 210b, 220b of the front torsion bar 210 and the rear torsion bar 220 are twisted in the same direction about the left end portions 210a, 220a. Consequently, elasticity of the front torsion bar 210 and the rear torsion bar 220 first functions.

Since the front links 211, 212 and the rear links 221, 222 rotate in the above-described manner, the lower portions 211c, 212c of the front links 211 and the lower portions 221c, 222c of the rear links 221, 222 both rotate by a predetermined angle in directions in which they separate from each other. The end portions 231a, 231a of the cylindrical members 231, 231 of the dampers 230, 230 are coupled to the lower portions 211c, 212c of the front links 211 via the front coupling pipe 240 and the front coupling links 241, 242, and the end portions 232a, 232a of the rod members 232, 232 of the dampers 230, 230 are coupled to the lower ends 221c, 222c of the rear links 221, 222 via the rear coupling pipe 250 and the rear coupling links 251, 252. Accordingly, when the lower portions 211c, 212c and 221c, 222c rotate in the separation directions, the rod members 232, 232 expand relatively to the cylindrical members 231, 231. Consequently, the impact force is absorbed owing to the damping force due to magnetism, oil viscosity, or the like of the dampers 230, 230. Accordingly, against an impact force involving a predetermined load fluctuation or larger, it is possible for both the damping force by the base net 40 and the damping force by the dampers 230 to function. When the base net 40 are displaced upward due to rebounding, the front links 211, 212 and the rear links 221, 222 rotate in the directions opposite the above due to returning forces of the front torsion bar 210 and the rear torsion bar 220. Consequently, the dampers 230, 230 are displaced in a direction in which the rod members 232, 232 contract relatively to the cylindrical members 231, 231. At this time, if the dampers 230, 230 are those whose damping forces act in whichever of the two directions they are displaced, the damping forces also act when the front links 211, 212 and the rear links 221, 222 rotate in the directions opposite the above, so that their movement can be delayed. Incidentally, as described above, the dampers 230, 230 whose damping forces can be set smaller when they are displaced in the weight releasing direction in which the human body is displaced upward than in the load application direction are also usable.

Figure 10:
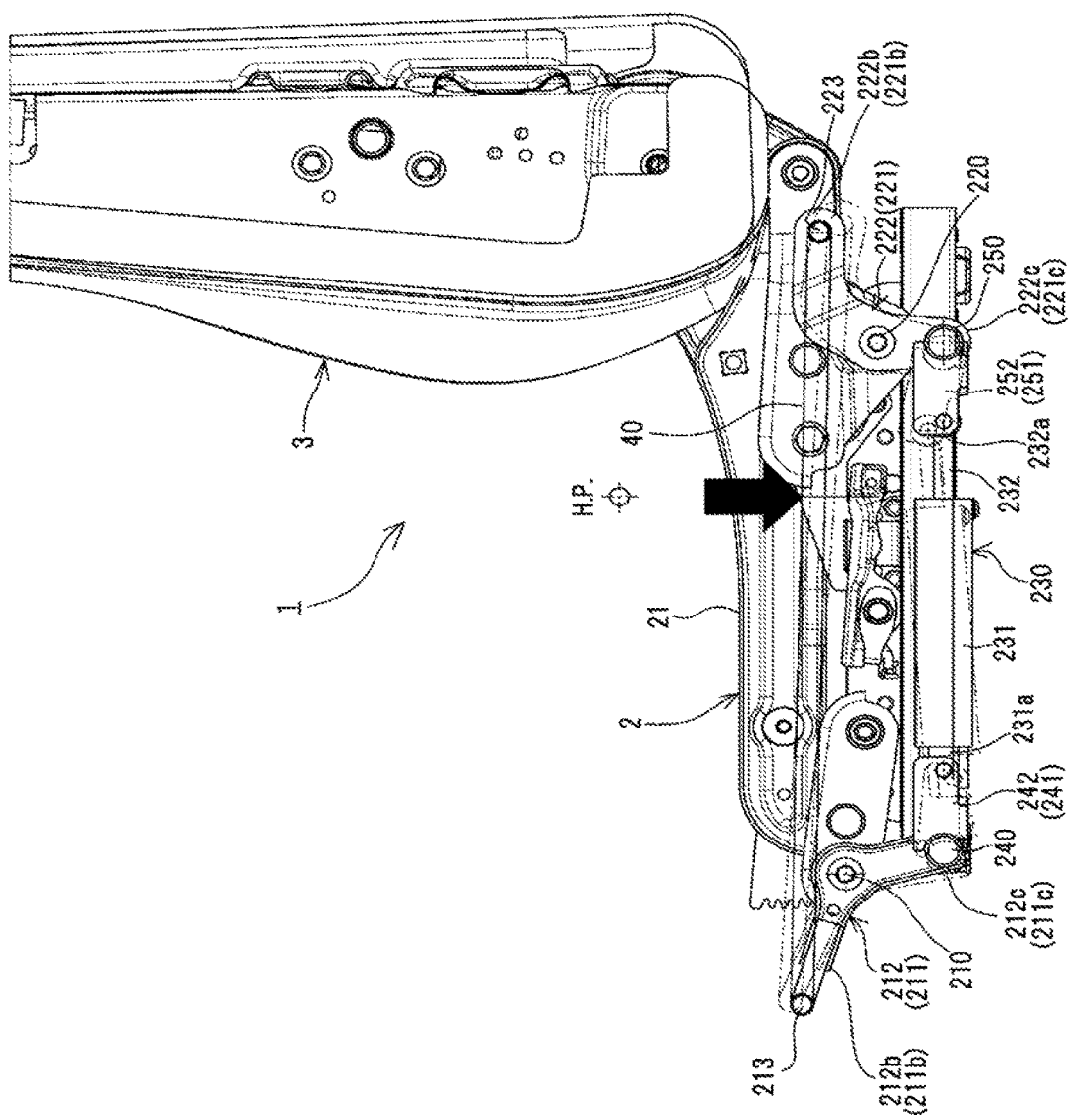
FIG. 10 is an explanatory view of the operation of the seat structure and the seat cushioning member support mechanism according to the embodiment, and is a view illustrating a state before relatively small vibration or microvibration is input and a state after the vibration is input.
Figure 11:
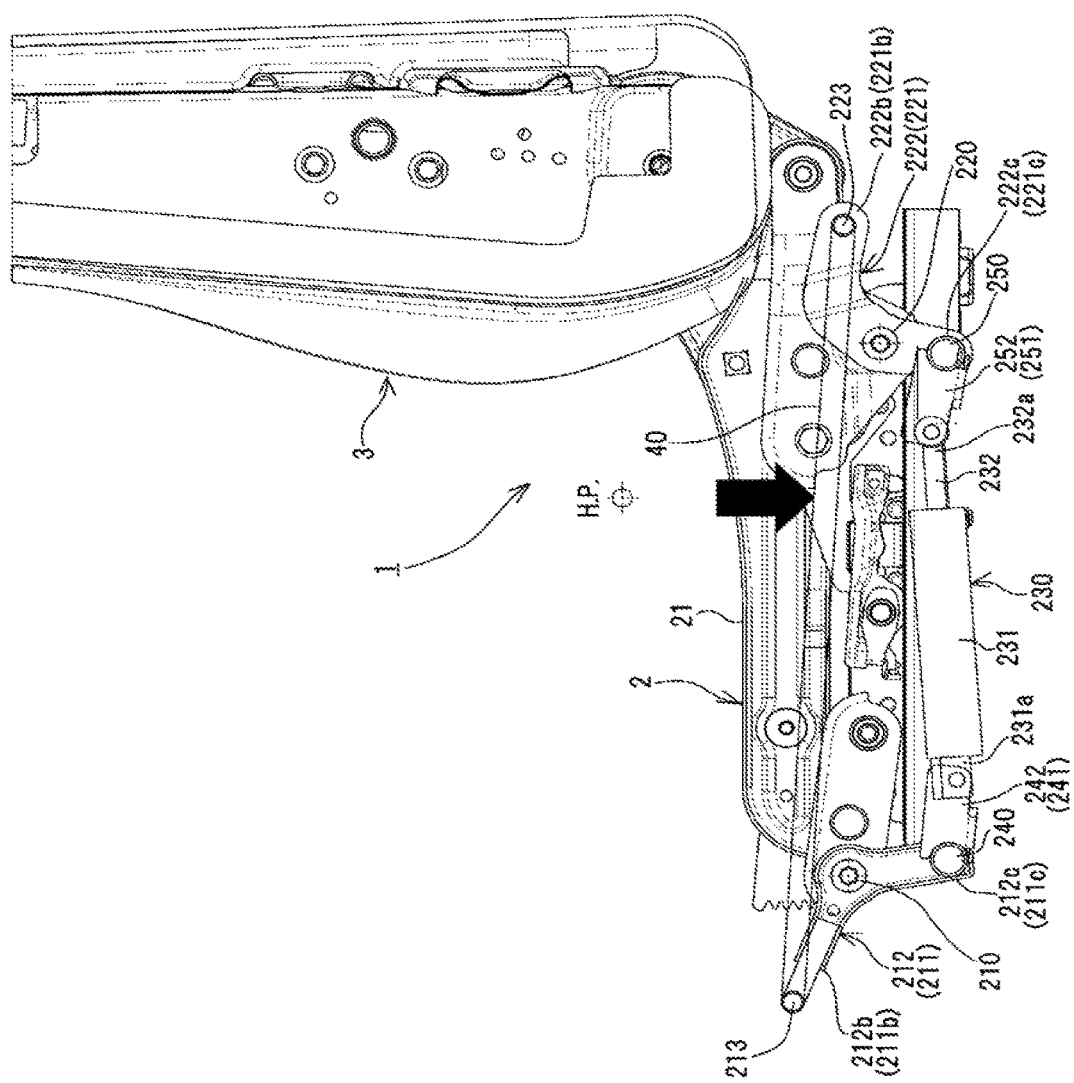
FIG. 11 is a view illustrating only the state after the relatively small vibration or the microvibration is input in FIG. 10.

On the other hand, when normal vibration (for example, microvibration whose amplitude is smaller than that of the aforesaid impact force) is input during driving, the vibration input causes a smaller load fluctuation in the base net 40 than the above (load fluctuation not large enough to cause the dampers 230 to expand or contract, or not large enough for the dampers 230 to exhibit the damping force because an expansion or contraction amount is small even though they expand or contract). This load fluctuation causes substantially no expansion and contraction operation of the dampers 230, resulting in an operation almost like that of one link member as a rigid body. Therefore, if the load is applied downward as illustrated in FIG. 10, the front links 211, 212 rotate clockwise as illustrated by the two-dot chain line in FIG. 10 and as illustrated in FIG. 11, but since the dampers 230 do not expand or contract, the dampers 230 move forward by being pulled by the lower portions 211c, 212c of the front links 211, 212. The dampers 230 undergo substantially no length change and thus pull the lower portions 221c, 222c of the rear links 211, 212 forward. Accordingly, the rear links 221, 222 rotate clockwise similarly to the front links 211, 212 from the posture illustrated by the solid line in FIG. 10 to the posture illustrated by the two-dot chain line in FIG. 10 and illustrated in FIG. 11. Since the dampers 230 are coupled to the lower portions 211c, 212c of the front links 211, 212 via the front coupling links 241, 242 and are coupled to the lower portions 211c, 222c of the rear links 221, 222 via the rear coupling links 251, 252, the dampers 230 are displaced from the posture, illustrated by the solid line in FIG. 10, substantially parallel to the installation surface to the slightly inclined posture illustrated by the two-dot chain line in FIG. 10 and illustrated in FIG. 11, with the rod members 232, 232 sides being higher than the cylindrical members 231, 231. When the small load fluctuation is repeated, such a motion is repeated, and the vibration is absorbed by the elasticity of the front torsion bar 210 and the rear torsion bar 220.

Incidentally, in order for the above-described operation to be easily exhibited, the interior angle of the substantially L-shape of each of the front links 212, 212 is preferably an obtuse angle so that the force is surely directed toward the hip point when the load is applied. Further, the positions about which the rear links 221, 222 rotate and at which the rear torsion bar 220 is coupled are preferably set close to the lower portions 221c, 222c of the rear links 221, 222. Consequently, the rear links 221, 222 easily rotate rearward (clockwise) when small vibration is input.

Figure 12:
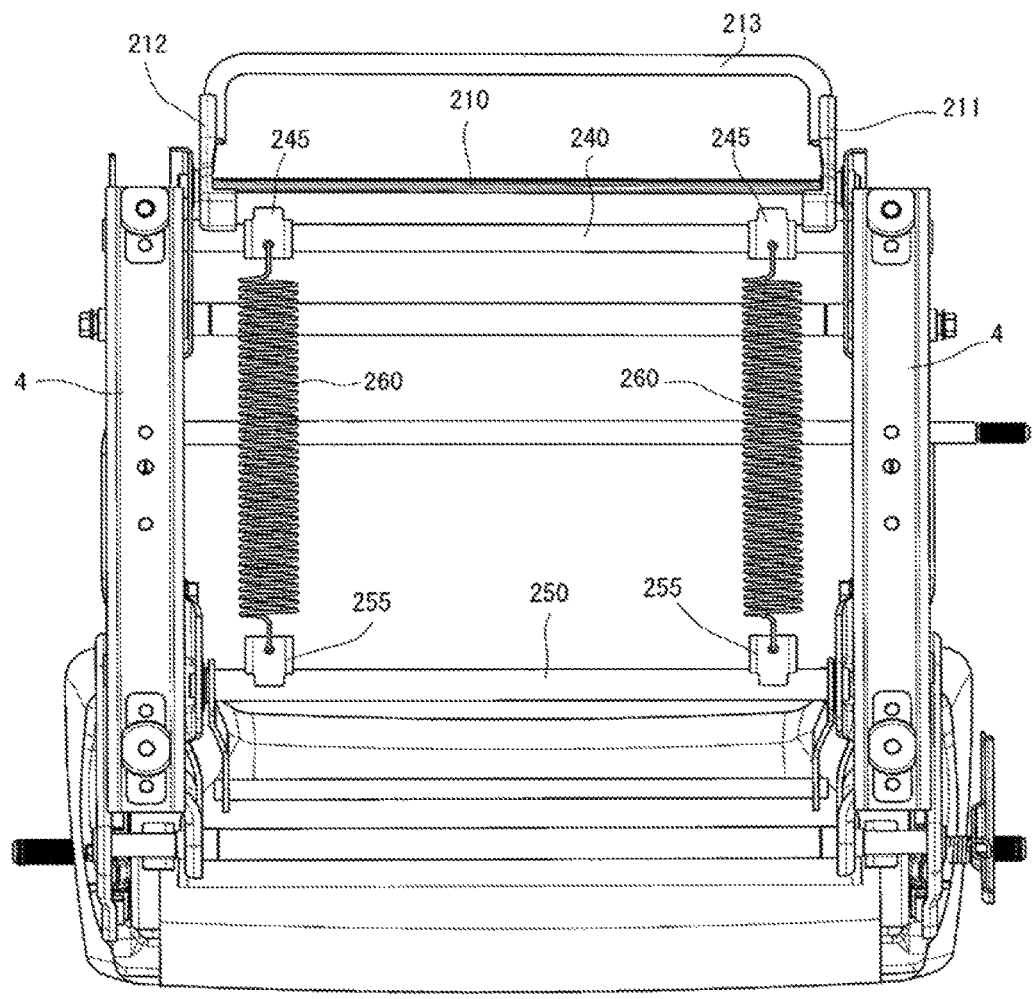
FIG. 12 is a bottom view illustrating an essential part of a seat structure according to another embodiment of the present invention.
Figure 13:
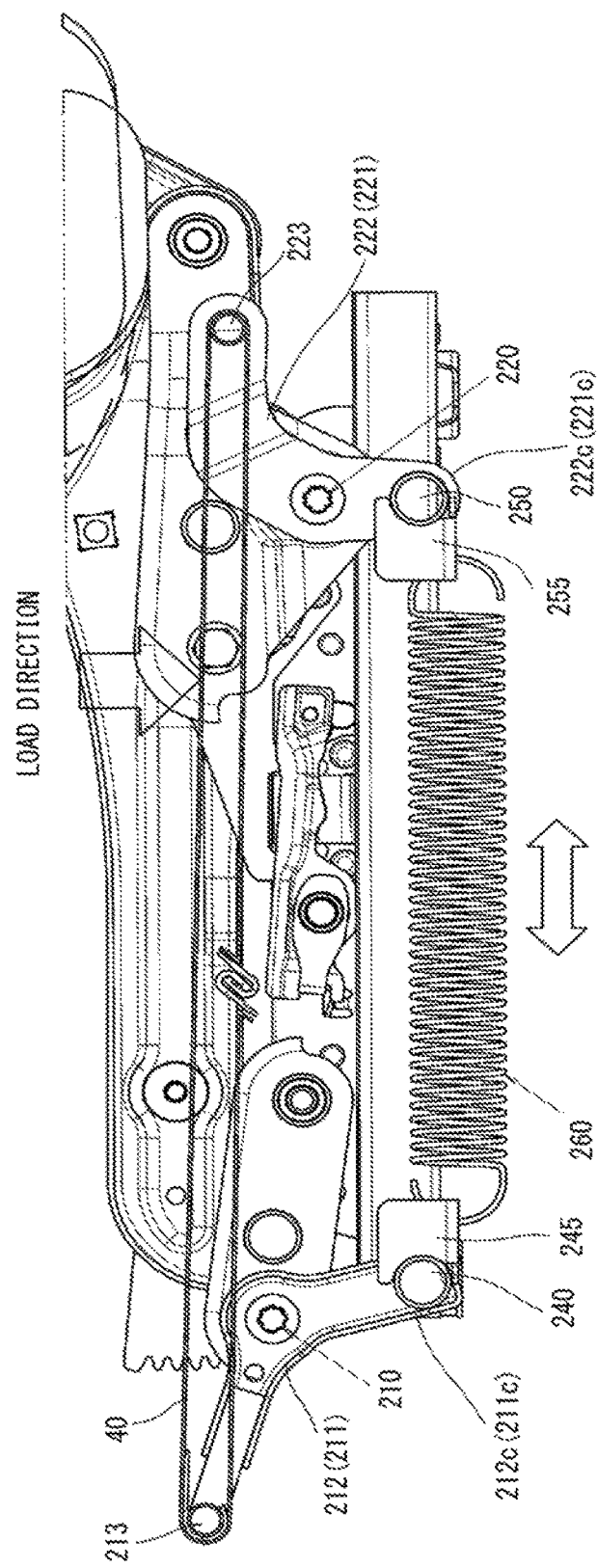
FIG. 13 is a view illustrating a side surface direction part seen from the center cross section of FIG. 12.

FIG. 12 and FIG. 13 illustrate another embodiment of the present invention, in which between lower portions 211c, 212c of front links 211, 212 and lower portions 221c, 222c of rear links 221, 222, coil springs 260, 260 are disposed as lower portion connecting mechanisms constituting a second spring-damping mechanism. Specifically, engagement brackets 245, 245, 255, 255 are provided on a front coupling pipe 240 and a rear coupling pipe 250 respectively, at an predetermined interval in a width direction of a seat, and the coil springs 260, 260 are disposed between the front and rear engagement brackets 245, 255.

According to this embodiment, the coil springs 260, 260 constituting the second spring-damping mechanism serve as a spring system arranged in series to a base net 40 and torsion bars 210, 220 constituting a first spring-damping mechanism, via the front links 211, 211 and the rear links 221, 222. As a result, a spring constant of the combination of the two spring systems is lower than a spring constant when they are each used alone, and a damping ratio increases. Therefore, in this embodiment, the combination of the spring systems in the series arrangement achieves a nonlinear spring characteristic, which can contribute not only to an improvement of a high-frequency characteristic but also to an improvement of a characteristic against impact vibration.

In this embodiment as well, it is possible to impart various characteristics by adjusting an initial tensile force of the base net 40, elastic forces of the coil springs 260, 260 and so on, the distance in the links 211, 212, 221, 222 from the torsion bars 210, 220 to connection positions with the base net 40 or the coil springs 260, 260, and so on.

Figure 14:
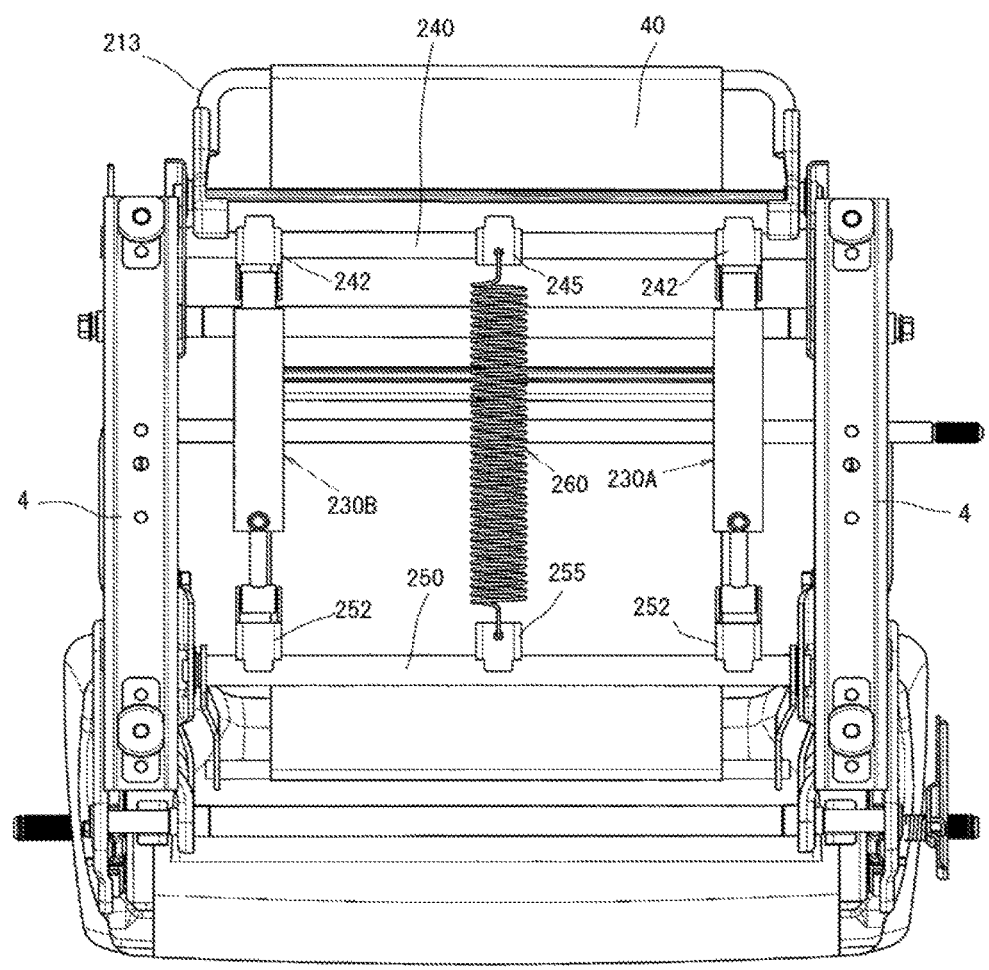
FIG. 14 is a bottom view illustrating an essential part of a seat structure according to still another embodiment of the present invention.
Figure 15:
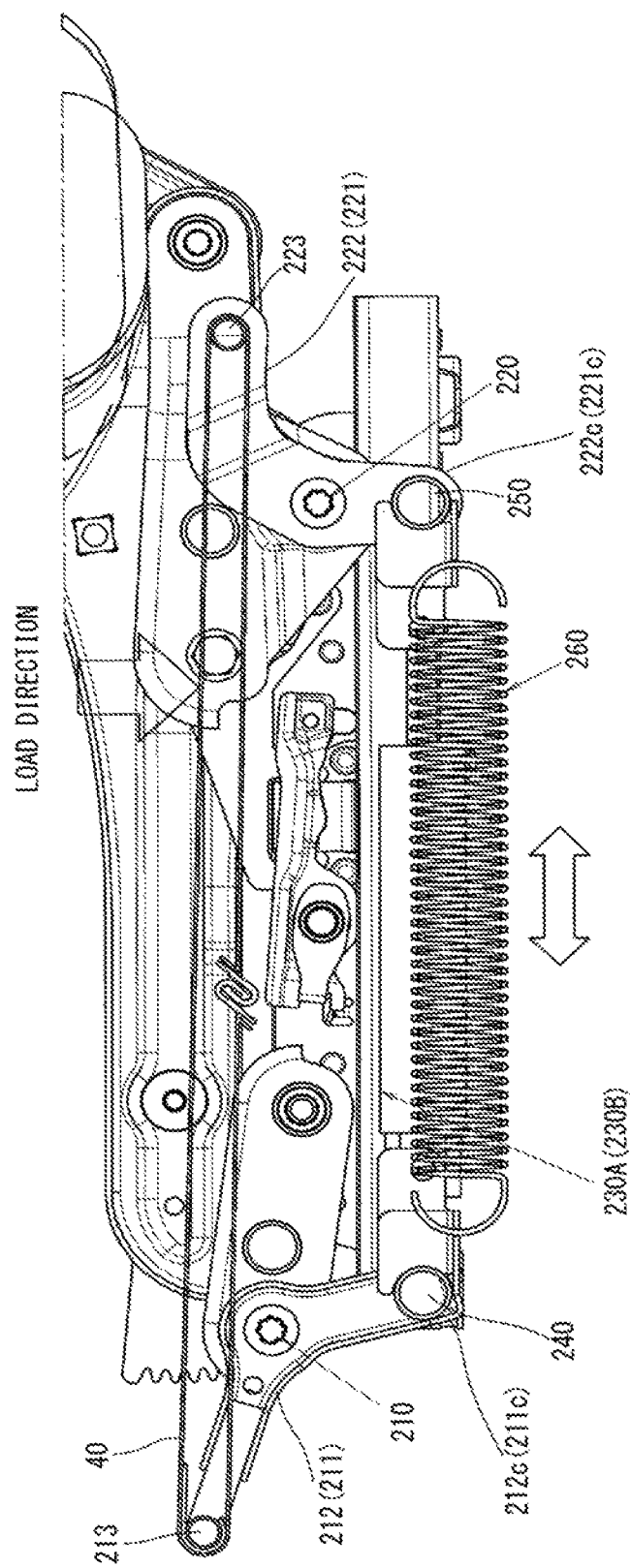
FIG. 15 is a view illustrating a side surface direction part seen from the center cross section of FIG. 14.

FIG. 14 and FIG. 15 illustrate still another embodiment of the present invention, in which between lower portions 211c, 212c of front links 211, 212 and lower portions 221c, 222c of rear links 221, 222, dampers 230A, 230B and a coil spring 260 are disposed in combination as lower portion connecting mechanisms constituting a second spring-damping mechanism. Specifically, the dampers 230A, 230B are disposed on vicinities of both widthwise sides of a front coupling pipe 240 and a rear coupling pipe 250 via front coupling links 242, 242 and rear coupling links 252 252, and the coil spring 260 is disposed to extend between substantially middle portions of the front coupling pipe 240 and the rear coupling pipe 250 via engagement brackets 245, 255. Further, as the damper 230A, a magnetic damper is used, and as the other damper 230B, a friction damper having a larger damping force than that of the magnetic damper is used.

According to this embodiment, the coil spring 260 included in the second spring-damping mechanism is a spring system element arranged in series to the first spring-damping mechanism, and the dampers 230A, 230B are damping system elements arranged in series to the first spring-damping mechanism. Accordingly, as compared with the case where they are each used alone, a spring constant decreases and a damping coefficient increases, so that a damping ratio further increases. This produces characteristics of bringing a resonance point to a lower frequency band and increasing a high-frequency vibration absorbing characteristic.

Test Examples

As the seat cushioning member support mechanism 200, those of the following four kinds different in the lower portion connecting mechanisms constituting the second spring-damping mechanism were prepared. That is, prepared were a seat cushioning member support mechanism using magnetic dampers as both of the pair of dampers 230, 230 disposed in the vicinities of the both side portions, which are illustrated in FIG. 1 to FIG. 11 (case 1), that using the two coil springs 260, 260 disposed in the vicinities of the both side portions, which are illustrated in FIG. 12 and FIG. 13 (case 2), that using the friction dampers as both the pair of dampers 230, 230 disposed in the vicinities of the both side portions, which are illustrated in FIG. 1 to FIG. 11 (case 3), and that using the combination of the magnetic damper 230A, the friction damper 230B, and the coil spring 260 illustrated in FIG. 14 and FIG. 15 (case 4). Note that the structure including the initial tensile force of the base net 40, the spring characteristics of the front torsion bar 210 and the rear torsion bar 220, and so on, which members constitute the first spring-damping mechanism, except the lower portion connecting mechanisms constituting the second spring-damping mechanism is the same in all of these.

Figure 16:
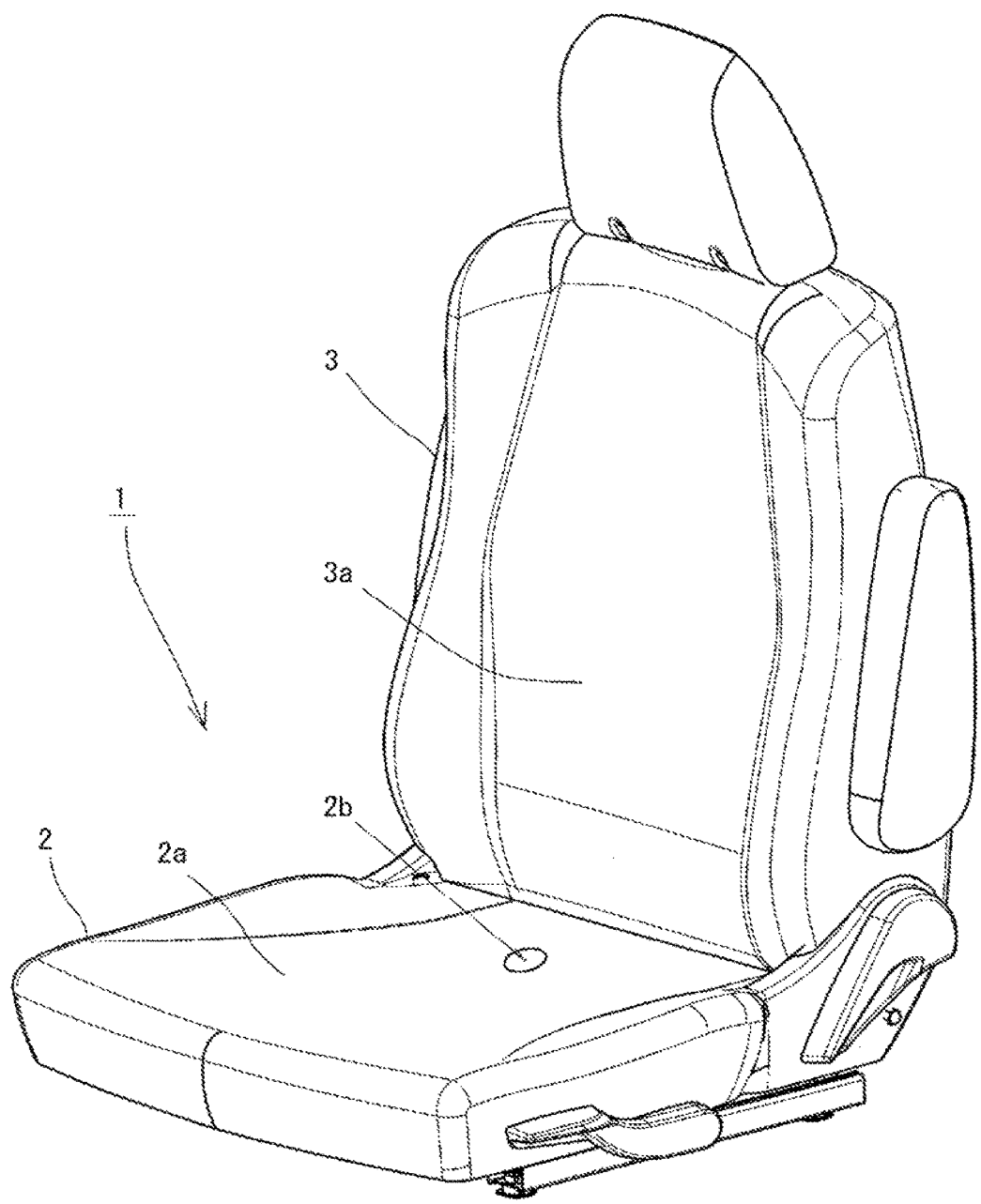
FIG. 16 is a perspective view of a seat structure used to explain a measuring method of test examples.
Figure 17:
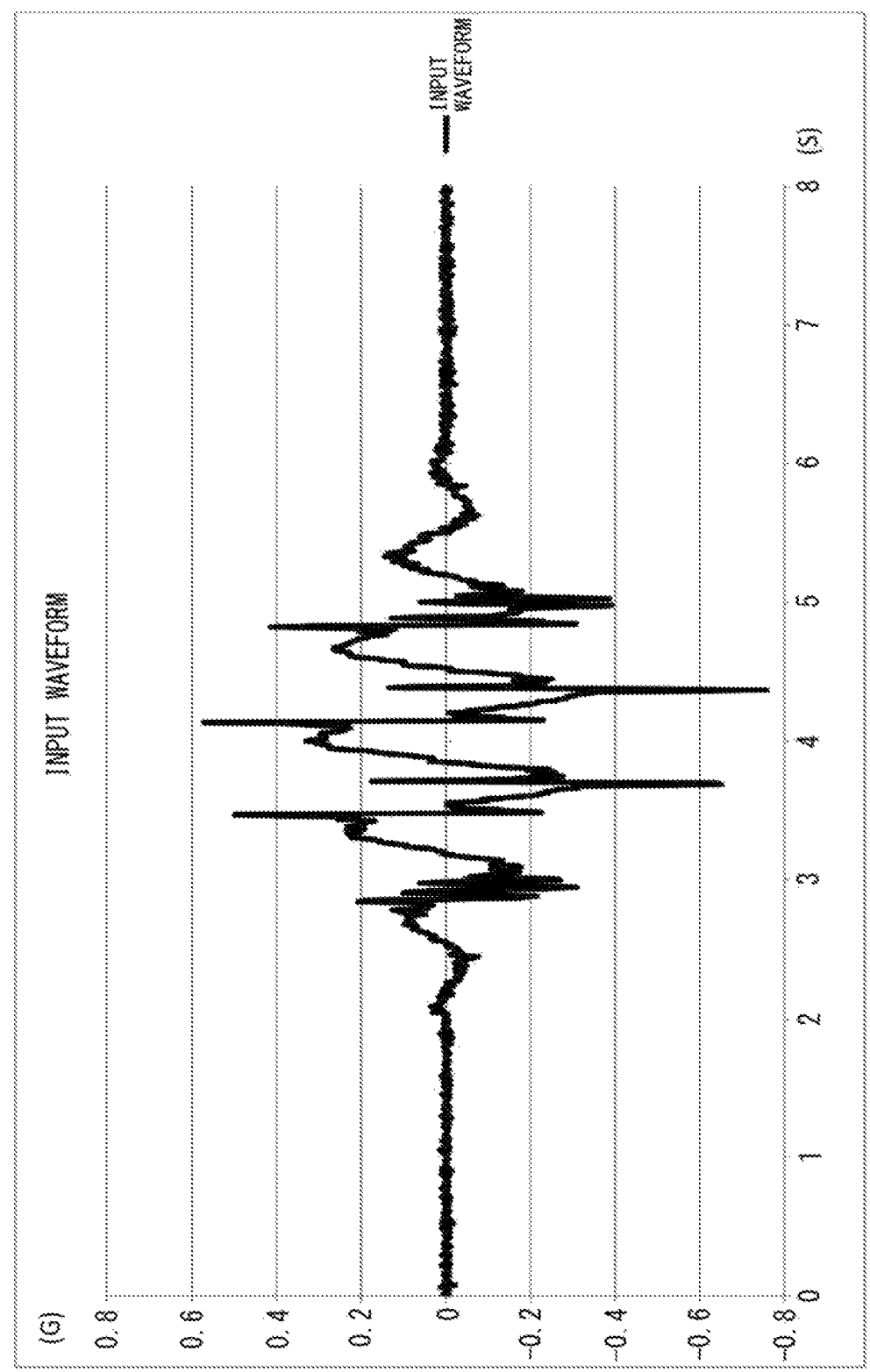
FIG. 17 is a chart illustrating an input waveform at the time of measuring impact vibration characteristics in the test examples.
Figure 18:
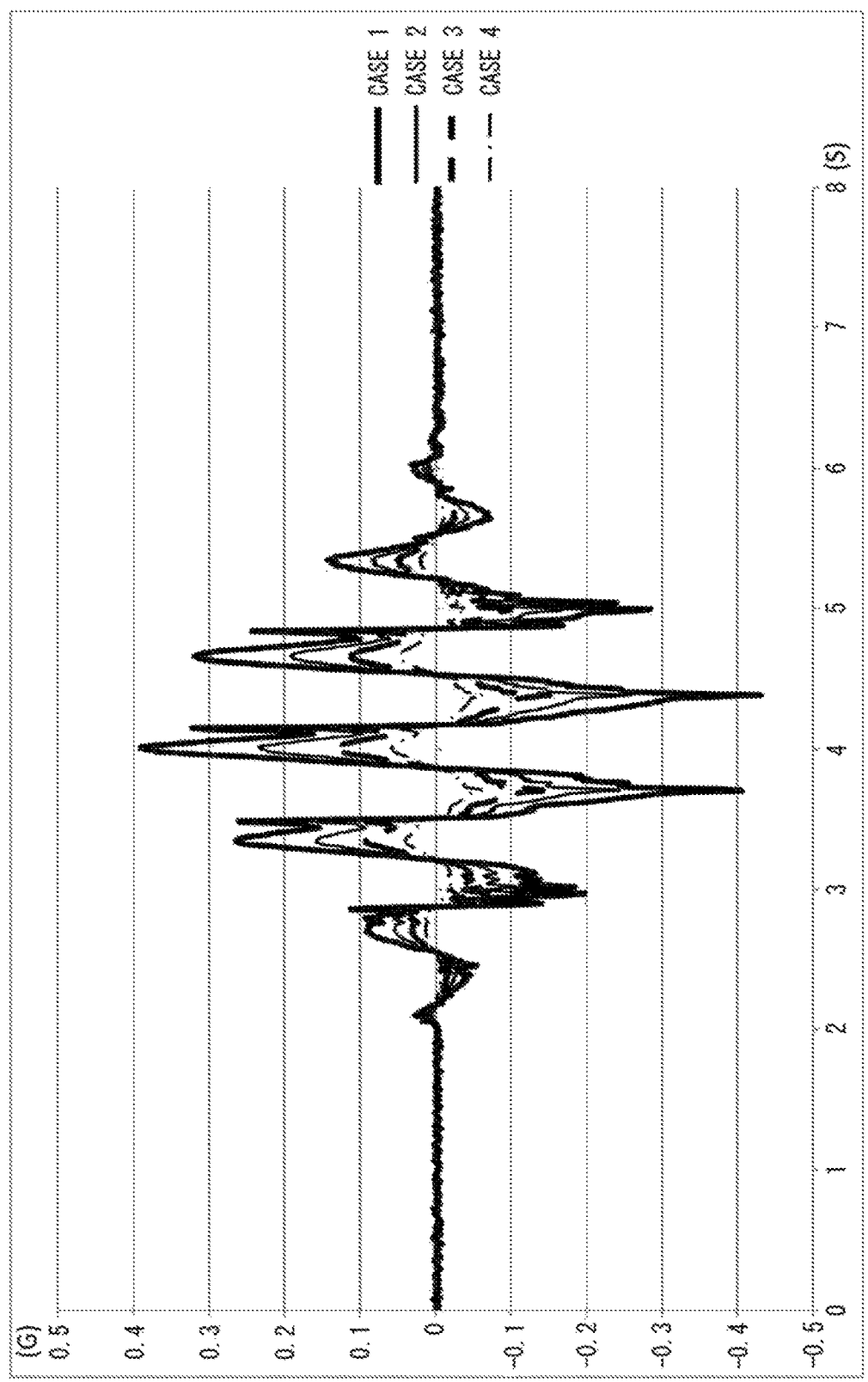
FIG. 18 is a chart illustrating measurement results of the impact vibration characteristics in the test examples.
Figure 19:
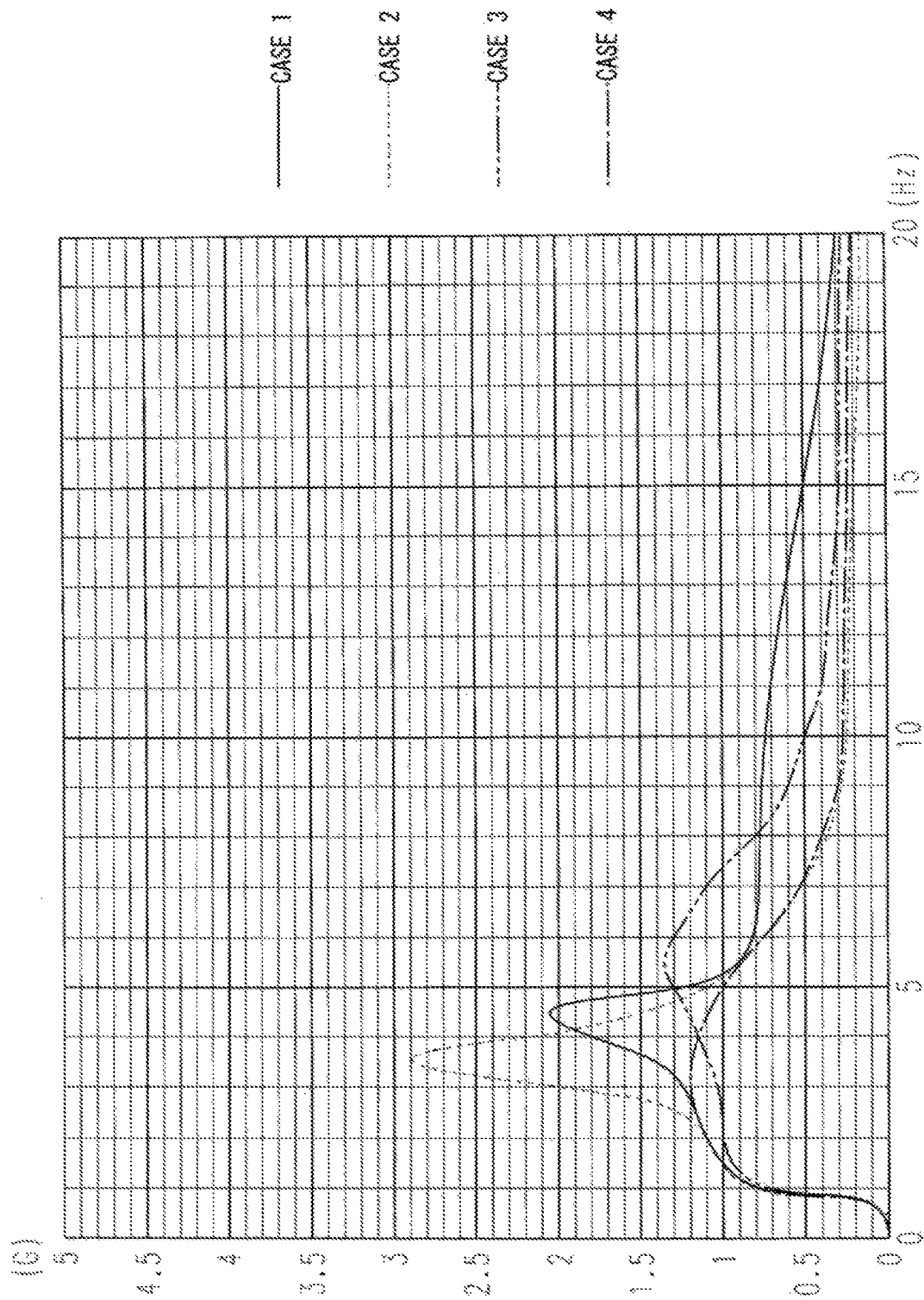
FIG. 19 is a chart illustrating measurement results of vibration transmission rates in the test examples.

As illustrated in FIG. 16, each of these seat cushioning member support mechanisms 200 was provided with another cushioning member (three-dimensional knitted fabric or the like) disposed on the base net 40 of the seat cushion part 2, this cushioning member was further covered with a surface layer 2a, a cushioning member (three-dimensional knitted fabric or the like) was provided also in the seat back part 3, and the cushioning member was covered with a surface layer 3a, whereby the seat structures 1 were formed. These seat structures 1 were each set on a vibrator, an acceleration sensor 2b was attached directly under the hip point of the seat cushion part 2, a subject was seated in the seat cushion part 2, and an impact vibration characteristic and a vibration transmission rate were measured. In the measurement of the impact absorbing characteristic, an input waveform illustrated in FIG. 17 was input as impact vibration. FIG. 18 and FIG. 19 illustrate the results.

As illustrated in FIG. 18, in the case 1, the impact vibration characteristic decreased by about 0.5 G relatively to an about 1.3 G maximum value of the input waveform, and thus a high impact absorbing characteristic was exhibited. In the case 2, the case 3, and the case 4, the impact vibration characteristic further decreases, and thus the series arrangement of the second spring-damping mechanism to the first spring-damping mechanism can greatly contribute to an improvement of the impact absorbing characteristic. Further, as is seen from the vibration transmission rate illustrated in FIG. 19, in the case 1 using the magnetic dampers, the resonance point was at less than 5 Hz, which is lower than a 6 to 8 Hz frequency band where a visceral resonance point is. In the case 3 using the friction dampers, the resonance point was near 5.5 Hz slightly higher than that in the case 1, but the vibration transmission rate was low. On the other hand, in both the case 2 and the case 4 using the coil spring(s) 260, the resonance point was at 3 to 4 Hz and thus was low and in addition the vibration transmission rate was low even in a high-frequency band of 7 Hz or higher.

From the above, it is seen that it is possible to provide seat structures having various characteristics depending on the kind, the combination, and so on of the lower portion connecting mechanisms constituting the second spring-damping mechanism.

In the above, the description is given, taking the case where the present invention is applied to the seat of the automobile as an example, but the present invention is also applicable to seats used in environments to which the vibration is input, for example, seats of aircrafts, trains, ships, and so on.

EXPLANATION OF REFERENCE SIGNS 1 seat structure
2 seat cushion part
3 seat back part
4 slide adjuster
20 cushion frame
21 side frame
22 front frame
23 rear frame
200 seat cushioning member support mechanism
210 front torsion bar
211, 212 front link
213 front support frame
220 rear torsion bar
221, 222 rear link
223 rear support frame
230, 230A, 230B damper
231 cylindrical member
232 rod member
240 front coupling pipe
241, 242 front coupling link
250 rear coupling pipe
251, 252 rear coupling link
260 coil spring
40 base net

The invention claimed is:
1. A seat cushioning member support mechanism which elastically supports a cushioning member of a seat cushion part, the seat cushioning member support mechanism comprising:

a first spring-damping mechanism to which an external vibration or impact as a trigger is input; and a second spring-damping mechanism which exhibits a spring-damping characteristic according to a displacement of the first spring-damping mechanism by the trigger inputted to the first spring-damping mechanism, wherein the first spring-damping mechanism and the second spring-damping mechanism are arranged in a stack direction and connected to each other via a link, and the first spring-damping mechanism and the second spring-damping mechanism are provided in a series positional relation;

wherein the seat cushion part has a front torsion bar and a rear torsion bar arranged at a predetermined interval from each other in a front and rear direction of a seat and extending along a width direction of the seat by being disposed to extend between a pair of side frames of the seat cushion coupled to upper rails of slide adjusters, and the link comprises: a front link whose middle portion is coupled to the front torsion bar and whose upper portion and lower portion are rotatable in the front and rear direction about the front torsion bar; and a rear link whose middle portion is coupled to the rear torsion bar and whose upper portion and lower portion are rotatable in the front and rear direction about the rear torsion bar, wherein the first spring-damping mechanism is constituted by the front torsion bar, the rear torsion bar, and the cushioning member disposed to extend between the upper portions of the front link and the rear link, and wherein the second spring-damping mechanism is constituted by a lower portion connecting mechanism including at least one of a damping member and an elastic member disposed to extend between the lower portions of the front link and the rear link.

2. The seat cushioning member support mechanism according to claim 1, wherein a plurality of the front links and a plurality of the rear links are coupled along the front torsion bar and the rear torsion bar respectively, wherein a front support frame is supported on the upper portions of the plural front links along the width direction of the seat, wherein a rear support frame is supported on the upper portions of the plural rear links along the width direction of the seat, and wherein the cushioning member is disposed to extend between the front support frame and the rear support frame.

3. The seat cushioning member support mechanism according to claim 2, wherein a front coupling pipe is supported on the lower portions of the plural front links along the width direction of the seat, wherein a rear coupling pipe is supported on the lower portions of the plural rear links along the width direction of the seat, and wherein the lower portion connecting mechanism is disposed between the front coupling pipe and the rear coupling pipe.

4. The seat cushioning member support mechanism according to claim 3, wherein the lower portion connecting mechanism has a front portion supported on a rear portion of a front coupling link whose front portion is fixed to the front coupling pipe, and has a rear portion supported on a front portion of a rear coupling link whose rear portion is fixed to the rear coupling pipe.

5. The seat cushioning member support mechanism according to claim 1, wherein the front link and the rear link are formed in a substantially L-shape and are disposed to face each other back-to-back.

6. The seat cushioning member support mechanism according to claim 1, wherein a plurality of the lower portion connecting mechanisms are disposed to extend between the lower portions of the front links and the rear links, and wherein the plural lower portion connecting mechanisms are constituted by a combination of only the damping members, a combination of only the elastic members, or a combination of the damping member and the elastic member.

7. The seat cushioning member support mechanism according to claim 6, wherein the damping member is included in the lower portion connecting mechanism and is formed using at least one kind out of a magnetic damper, a friction damper, and an oil damper.

8. The seat cushioning member support mechanism according to claim 6, wherein the elastic member is included in the lower portion connecting mechanism and is formed using a coil spring.

9. The seat cushioning member support mechanism according to claim 1, wherein the cushioning member extending between the upper portions of the front link and the rear link is a base net located on a lower layer out of a plurality of vertically arranged cushioning members included in the seat cushion part.

10. A seat structure including a seat cushion part having: a cushion frame including a pair of side frames arranged at a predetermined interval from each other in a width direction of a seat; and a cushioning member supported by the cushion frame, wherein the cushioning member is supported by the seat cushioning member support mechanism according to claim 1, and wherein the front torsion bar and the rear torsion bar included in the seat cushioning member support mechanism are disposed to extend between the pair of side frames in the cushion frame.

* * * * *